(12) United States Patent
Entschew et al.

(10) Patent No.: US 9,596,089 B2
(45) Date of Patent: Mar. 14, 2017

(54) METHOD FOR GENERATING A CERTIFICATE

(75) Inventors: Enrico Entschew, Berlin (DE);
Klaus-Dieter Wirth, Berlin (DE)

(73) Assignee: BUNDESDRUCKEREI GMBH, Berlin (DE)

(*) Notice: Subject to any disclaimer, the term of this patent is extended or adjusted under 35 U.S.C. 154(b) by 635 days.

(21) Appl. No.: 13/704,351

(22) PCT Filed: Jun. 10, 2011

(86) PCT No.: PCT/EP2011/059716
§ 371 (c)(1),
(2), (4) Date: Jul. 24, 2013

(87) PCT Pub. No.: WO2012/000775
PCT Pub. Date: Jan. 5, 2012

(65) Prior Publication Data
US 2013/0318354 A1    Nov. 28, 2013

(30) Foreign Application Priority Data
Jun. 28, 2010   (DE) ........................ 10 2010 030 590

(51) Int. Cl.
*H04L 29/06* (2006.01)
*H04L 9/32* (2006.01)
*G06F 21/64* (2013.01)

(52) U.S. Cl.
CPC .......... *H04L 9/3263* (2013.01); *G06F 21/645* (2013.01); *H04L 9/3234* (2013.01);
(Continued)

(58) Field of Classification Search
CPC .......... G06F 21/645; G06F 2221/2103; G06F 2221/2153; H04L 9/3234; H04L 9/3247; H04L 9/3263; H04L 2209/805
(Continued)

(56) References Cited

U.S. PATENT DOCUMENTS 5,671,279 A * 9/1997 Elgamal ................ G06Q 20/02
                                                         380/29
5,784,463 A * 7/1998 Chen et al. .................... 713/171
(Continued)

FOREIGN PATENT DOCUMENTS

| DE | 102 59 270 | 7/2004 |
| DE | 10 2008 000 067 | 7/2009 |
| EP | 1 549 019 | 6/2005 |

OTHER PUBLICATIONS

Bamasak, et al, 'A Secure Method for Signature Delegation to Mobile Agents', SAC' 04, Mar. 14-17, 2004, entire document, http://www.signcryption.org/publications/pdffiles/BamasakZhang-acmsac04.pdf.*
(Continued)

*Primary Examiner* — Luu Pham
*Assistant Examiner* — Ronald Baum
(74) *Attorney, Agent, or Firm* — Leveque IP Law, P.C.

(57) ABSTRACT

The invention relates to a method for generating a certificate for signing electronic documents by means of an ID token (106), having the following steps: —sending (201) a transaction request for a user to carry out a transaction, —as a result of the sending of the transaction request, a check is carried out as to whether the certificate (519) is available and if this is not the case, carrying out the following steps: generating (206) an asymmetrical key pair consisting of a private key and a public key using an ID token, said ID token (106) being assigned to the user; storing (207) the generated asymmetrical key pair on the ID token, wherein at least the private key is stored in a protected memory region of the ID token; transmitting (208; 509) the generated public key (518) to a first computer system, and generating (209) the certificate (519) by means of the first computer system for the public key.

17 Claims, 9 Drawing Sheets

Figure 1:
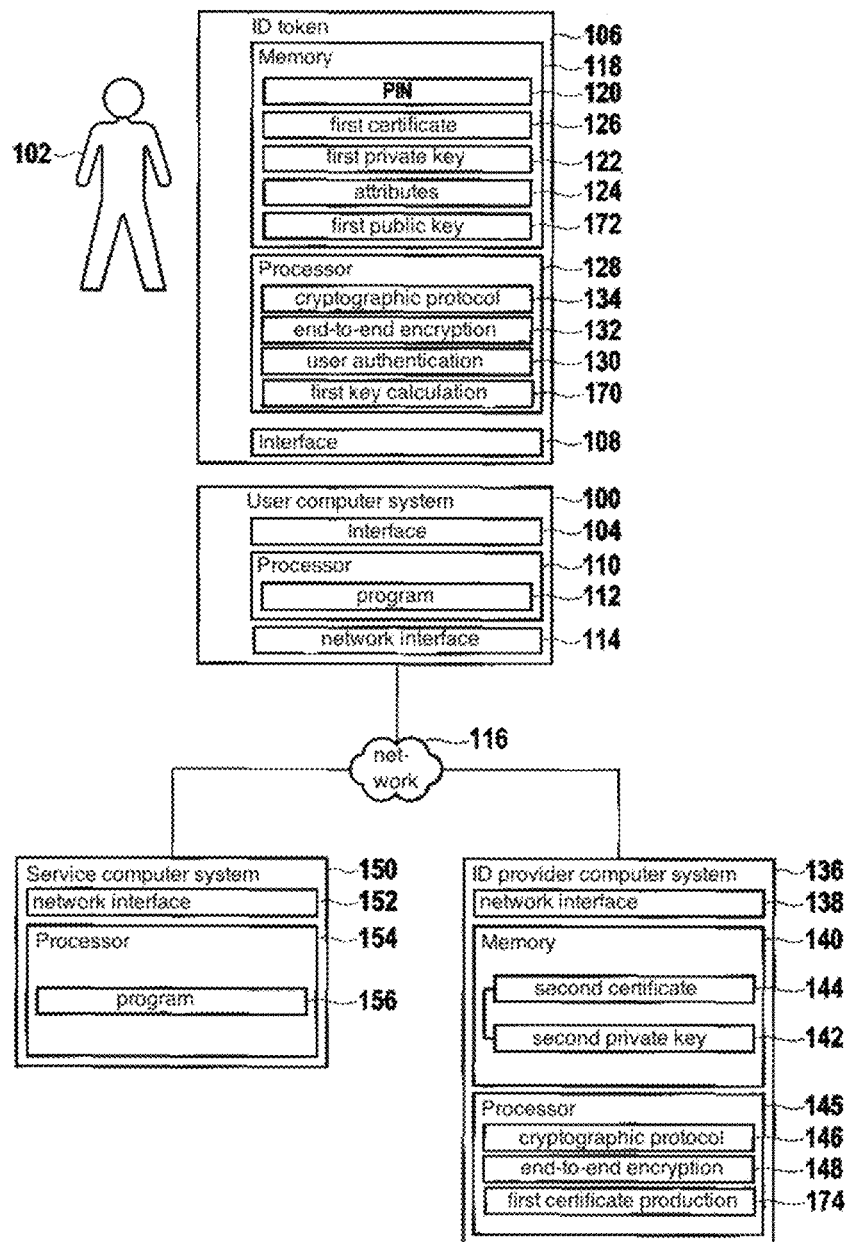

(52) U.S. Cl.
 CPC .... *H04L 9/3247* (2013.01); *G06F 2221/2103* (2013.01); *G06F 2221/2153* (2013.01); *H04L 2209/805* (2013.01)

(58) Field of Classification Search
 USPC ........................................................ 713/175
 See application file for complete search history.

(56) References Cited

U.S. PATENT DOCUMENTS

| | | | | |
|---|---|---|---|---|
| 5,864,667 | A * | 1/1999 | Barkan | H04L 9/083 380/279 |
| 6,209,095 | B1 * | 3/2001 | Anderson et al. | 713/176 |
| 6,237,096 | B1 * | 5/2001 | Bisbee et al. | 713/178 |
| 6,463,534 | B1 * | 10/2002 | Geiger | G06F 21/10 380/278 |
| 7,096,494 | B1 * | 8/2006 | Chen | G06Q 20/04 380/259 |
| 7,139,910 | B1 * | 11/2006 | Ainsworth | G06Q 20/401 713/155 |
| 7,484,089 | B1 * | 1/2009 | Kogen | H04L 63/062 713/156 |
| 7,742,605 | B2 * | 6/2010 | Hornak | 380/277 |
| 7,801,826 | B2 * | 9/2010 | Labrou | G06Q 20/02 705/50 |
| 8,225,089 | B2 * | 7/2012 | Wang | G06Q 20/00 380/255 |
| 2002/0016913 | A1 * | 2/2002 | Wheeler et al. | 713/170 |
| 2002/0152180 | A1 * | 10/2002 | Turgeon | G06Q 20/04 705/72 |
| 2003/0115468 | A1 * | 6/2003 | Aull et al. | 713/175 |
| 2003/0236985 | A1 * | 12/2003 | Ruuth | G06F 21/35 713/173 |
| 2004/0039919 | A1 * | 2/2004 | Takayama | G06Q 20/04 713/180 |
| 2004/0243802 | A1 * | 12/2004 | Jorba | G06F 21/10 713/168 |
| 2005/0033702 | A1 * | 2/2005 | Holdsworth | G06F 21/34 705/67 |
| 2005/0102507 | A1 * | 5/2005 | Sozzani et al. | 713/165 |
| 2005/0154875 | A1 * | 7/2005 | Chao | G06F 21/445 713/156 |
| 2006/0156001 | A1 | 7/2006 | Nolte | |
| 2007/0271456 | A1 * | 11/2007 | Ward | H04L 9/3247 713/156 |
| 2007/0276765 | A1 * | 11/2007 | Hazel | G06F 21/72 705/71 |
| 2008/0208746 | A1 * | 8/2008 | Royyuru | G06Q 20/10 705/44 |
| 2008/0288351 | A1 * | 11/2008 | Leung | G06Q 20/20 705/14.26 |
| 2009/0125429 | A1 * | 5/2009 | Takayama | G06Q 20/04 705/35 |
| 2009/0132813 | A1 * | 5/2009 | Schibuk | G06Q 20/223 713/158 |
| 2009/0210712 | A1 * | 8/2009 | Fort | H04L 63/1441 713/175 |
| 2009/0239503 | A1 * | 9/2009 | Smeets | H04L 63/06 455/411 |
| 2009/0319793 | A1 * | 12/2009 | Zic et al. | 713/172 |
| 2010/0185864 | A1 * | 7/2010 | Gerdes, Jr. | H04L 9/3213 713/175 |
| 2011/0031310 | A1 * | 2/2011 | Wilson | 235/380 |
| 2011/0211699 | A1 * | 9/2011 | Ma et al. | 380/278 |
| 2011/0289318 | A1 * | 11/2011 | Zhang | H04L 9/3247 713/176 |

OTHER PUBLICATIONS

Ruiz-Martinez, A., et al, 'A Survey of Electronic Signature Solutions in Mobile Devices', Oct. 15, 2007, Univ. of Murcia, Dept. of Information & Communications Engineering, entire document, http://www.jtaer.com/dec2007/ruiz_sanchez_martinez_gomez_p7.pdf.*
EPO, PCT ISR, PCT/EP2011/059716, Aug. 11, 2011, English translation.
Federal Office for Information Security, "Technical Guideline eID-Server", BSI TR-03130 Version 1.0, Jul. 14, 2009, Section 2.1—English available Version 2.0.1.
Federal Office for Information Security, "Architecture electronic Identity Card and electronic Resident Permit", TR-03127 Version 0.5, Apr. 17, 2009, Sections 3.2, 3.2.3, 3.3, 4.5 & 5.3—English available Version 1.13.
Federal Office for Information Security, "eCards mit kontaktloser Schnittstelle als sichere Signaturerstellungseinheit", TR-03117 Version 1.0, Jan. 1, 2009, Section 4.3.2—English version not available.
Federal Office for Information Security, "eCard-API-Framework-Protocols", TR-03112-7 Amendment 1, Sep. 10, 2009, Section 2—English available Version 1.1.5.

* cited by examiner

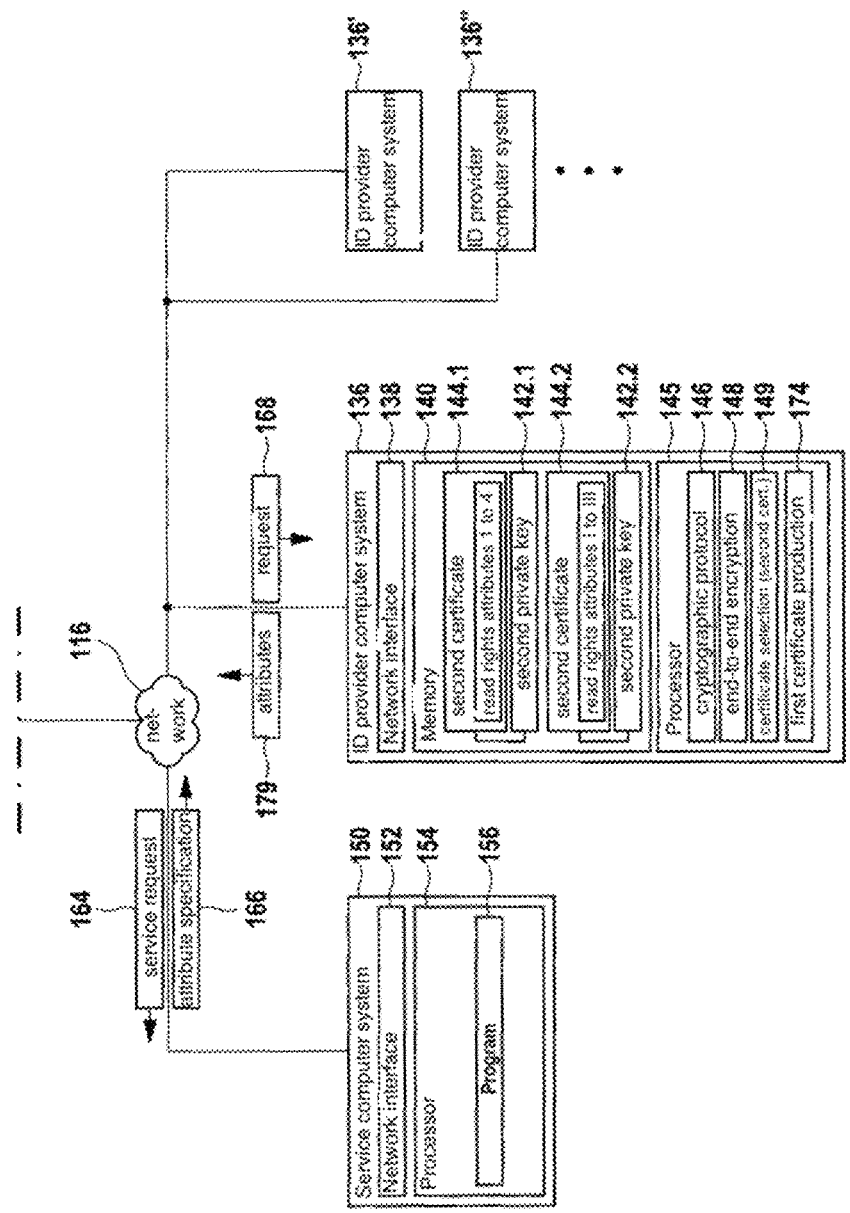

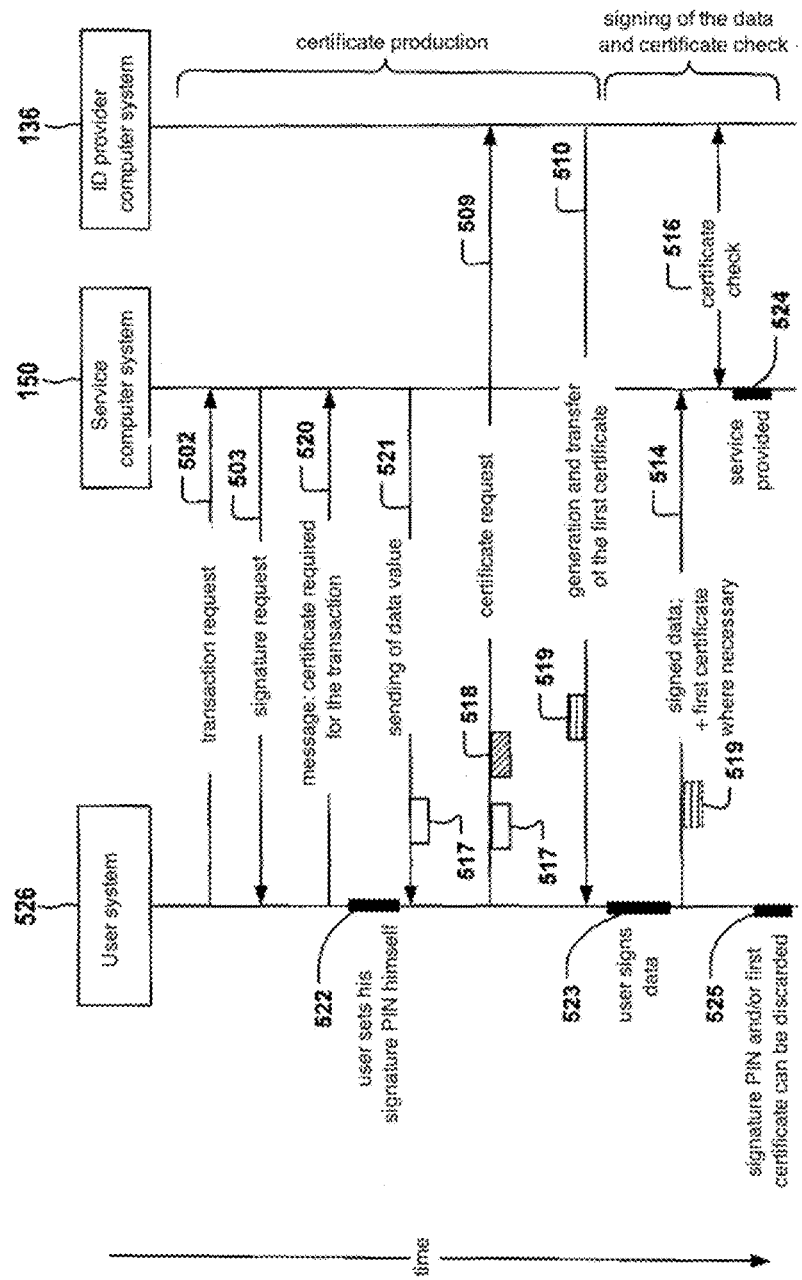

METHOD FOR GENERATING A CERTIFICATE

The invention relates to a method for generating a certificate, to a computer system and to an ID token.

The prior art discloses various methods for generating certificates and/or for detecting the "digital identity" of a user:

Microsoft Windows CardSpace is a client-based digital identity system which is intended to allow Internet users to communicate their digital identity to online services. One drawback in this context, inter alia, is that the user can manipulate his digital identity.

By contrast, OPENID is a server-based system. What is known as an "identity server" stores a database with the digital identities of the registered users. One drawback of this, inter alia, is inadequate data protection, since the digital identities of the users are stored centrally and the user behavior can be recorded.

U.S. 2007/0294431 A1 discloses a further method for managing the digital identities, which likewise requires user registration.

Quite generally, various methods for signing electronic documents are known, which have the function of providing the signed document with a legally binding characteristic. This is achieved for example in that a body authorized for certification assigns a user a digital certificate, on one occasion for example, and, for example, an asymmetric key pair for signing electronic documents.

A general problem when using electronic certificates and cryptographic encryption methods to produce electronic signatures, particularly qualified electronic signatures, is the fact that the certificates known from the prior art are valid in in a general manner for a qualified electronic signature and are valid over a long period of time, but there are a large number of people and users for whom a certificate of this type offers to much responsibility for too little benefit. Said problem concerns, particularly but not exclusively, less technically adept users. Since a qualified electronic signature has legally binding consequences for the user with associated with this signature, there is a high potential for misuse, should the technical means for signing, such as a private signature key, end up in the wrong hands. If the user only very rarely carries out electronic transactions for which an electronic signature is necessary (for example the receipt of credit via the Internet, an online-based submission of the annual tax return, etc.), the risk of misuse compared to the benefit of a qualified electronic signature is thus too high for many users.

Many legally binding business dealings can now theoretically be carried out by means of a qualified electronic signature, although in practice many users still prefer to use postal methods when handling these business dealings, since many users consider the use of an electronic signature, particularly a qualified electronic signature, to be too unsafe and/or technically too complex. Many people are not ready to permanently associate themselves with certificates for one or more signature key pairs and to thus be responsible for the safekeeping of the keys and for the secrecy of PINs or passwords for use of said key pairs, since any misuse of these keys and PINs will first be attributed to them until they can prove otherwise beyond doubt (principle of shifting the burden of proof).

By contrast, the invention is based on the object of providing an improved method for producing a first digital certificate, and also a corresponding computer system and a corresponding ID token.

In one aspect, the object of the present invention is to provide a facilitated method for identifying people in a public-key-infrastructure provider (certificate issuer). In this case, the person can be identified to the certificate issuer by means of personal appearance, telephone contact, or electronic identification based on cryptographic means for example. In particular, identification electronically by cryptographic means, as is enabled by embodiments of the present invention in addition to other forms of identification, is advantageous since electronic authentication of a user to a certificate issuer enables a method without media disruption for identifying people and for issuing a certificate associated with this person.

In a further aspect, the object of the invention is to provide a method for generating a first digital certificate, which offers a high level of protection against misuse. The acceptance of electronic signatures is thus to be improved for the handling of legally binding business dealings and more users are to be gained for the use of electronic transaction methods.

In a further aspect, the object of the present invention is to enable providers of business processes, such as department stores, online shops or banks, as well as providers of public key infrastructures, to minimize risks for proprietors of keys and certificates and to thus encourage a larger coverage for the electronic handling of business processes. Furthermore, administrative processes can be automated and costs can be reduced by embodiments of the present invention.

In a further aspect, embodiments of the present invention constitute particularly attractive forms of the electronic handling of business processes for the providers of services, since not only is the identity of the customer verifiable by means of a certificate assigned to the customer, but the providers of the services and business processes can also be granted the option of issuing a legitimizing certificate for a customer and/or a specific scheduled business process, which is not valid for other business processes, for example business transactions with competitors, and/or which can be blocked subsequently. By way of example, once a signed electronic document has been received, checked and possibly documented and archived, the provider of a business process can thus request directly the deletion of the respective certificate and can thus rule out for example the possibility that the certificate will be used by the person with whom it is associated, in this case therefore by a specific customer, for a transaction in which business is done with a competitor.

According to preferred embodiments of the invention, an electronic certificate contains details concerning the validity of a public key. Said public key forms an asymmetric key pair together with a private key. The private key is used to encrypt data, for example data of an electronic document, or to encrypt derived data of an electronic document, for example a hash value of the electronic document. By encrypting said data of an electronic document using the private key, the electronic document is signed. A certificate belonging to or associated with a signed electronic document is thus a certificate that confirms the validity of a private key with which the electronic document has been signed.

An advantageous aspect of embodiments of the present invention is the fact that flexible issuing and use, as required, of electronic certificates is made possible. The associated restriction of the validity of certificates used for signature purposes reduces the risk of misuse of electronic signatures, since these, according to embodiments of the invention, are always only valid for specific occasions, periods, agreement types and/or are only valid for a single electronic document or a single transaction.

Hereinafter, a "transaction" is understood to mean a data processing step, which is carried out by a computer-based system or apparatus once a transaction request has been received. The data processing step may be a technical control or regulation step for example.

By way of example, a transaction may be the initiation of a switching operation or of a switching process consisting of a plurality of switching operations. A transaction may also be a data processing process for processing technical, medical, financial, logistical or other data. A transaction may consist of a single data processing step or a series of steps, which together result in a specific effect, for example the processing of data to calculate a result and/or a physically measurable change of state on the computer-based system or apparatus. By way of example, a transaction may be a control process or regulation process, as occurs in home electronics (control of home lighting, blinds, heating, etc.), or the handling of a business dealing, for example a legally binding business dealing to set up a bank account. According to further embodiments, a transaction may also be a database transaction.

A transaction request is a request to carry out a transaction. A transaction request may, in particular, be a request to carry out a transaction transmitted electronically, for example an http request, an e-mail, the request of a web service, remote procedure calls, etc. A transaction request can be based on various technical protocols for data transmission and/or for initiation of program functions on a remote computer-based system, wherein the authority that emits the transaction request is not the same authority that carries out the requested transaction. By way of example, the transaction request can be transmitted from the sender to the receiver via the Internet, Bluetooth, an infrared interface, etc. In particular, a transaction request can be a request, transmitted electronically, to transmit information or a request for the delivery of goods or a request for the provision of a service.

A "service request" is a request to carry out a data processing step, wherein the service request is produced by the same authority that also generates the transaction request, and wherein the service request is directed to the same target authority as the transaction request. The service request is thus associated with the transaction request and causes attributes associated with the user to be read and transmitted to the service provider.

The association of a service request with a transaction request means that the service request may be a component of the transaction request. Alternatively, the service request may precede the transaction request, wherein be successful provision of the requested service may be necessary for the execution of the transaction request. A service request may also follow the respective transaction, and the successful implementation of the requested transaction may be necessary for the production of the service request.

Should a service provider offer a plurality of electronic services limited to a specific user group for example, wherein the execution of each service is initiated by a transaction request, attributes may be transmitted for example from the ID token to the service as a result of the service request. These attributes may prove that the user is authorized to request any of the provided services on the basis of the user group to which he belongs. Alternatively, it is possible that a service request is also transmitted to the service together with a transaction request for a specific service, with the consequence that attributes proving the user to be authorized for this service are transmitted to the service provider.

The objects of the invention are achieved by the features of the independent patent claims. Embodiments of the invention are disclosed in the dependent claims.

According to preferred embodiments of the present invention, the validity of a certificate produced after receiving a transaction request for a specific user is thus limited. By way of example, the certificate is only valid for a few days, only for one electronic document or a few electronic documents, or only for a specific service providers, such as a department store or a specific bank. According to further embodiments of the invention, the certificate issued for signature purposes is only valid for a single document or a single transaction, only for the implementation of a one-off switching process, for example the switching on of a heating system or the opening of a security door, etc. The user associated with this certificate, of which the validity is limited, therefore does not have to potentially safeguard the certificate or the affiliated signature key associated with him for a year, since said certificate becomes invalid after a specific period of time or in any case is only valid for a single transaction or for one electronic document to be signed over the course of this transaction. The user therefore does not have to worry about the whereabouts of his signature key or the storage medium on which this key is stored once the transaction is complete. New groups of users for digital certificates and electronic transactions can thus be gained. The technical development in the field of electronic transactions is accelerated, administrative effort and costs, which are produced in conjunction with electronic transactions, are reduced, and security against misuse of electronic certificates and respective signature keys is increased considerably.

Since certificates according to embodiments of the present invention are requested according to a specific transaction request at a certification service provider (CSP) and are limited in terms of their validity, specifically for one or a few documents, the method for producing electronic certificates according to embodiments of the present invention is particularly secure. Both the key material, which is to be used to encrypt and sign electronic documents, and the respective certificate are generated specifically for the respective purpose, such that the validity of the certificate is restricted in terms of time, function and people and in a document-based and/or transaction-based manner.

In a further aspect, the present invention relates to an ID token, which is associated with a user and is suitable for the generation of certificates according to the invention. Embodiments of the ID token according to the invention also constitute particularly secure storage media for storing the keys used for signature purposes, such that the key material stored in an ID token is protected against misuse, even if the ID token is lost.

By way of example, the ID token may be a portable electronic appliance, such as a USB stick, or a document, particularly a value document or security document.

According to the invention, a "document" is understood in accordance with the invention to mean paper-based and/or plastic-based documents in particular, such as identification documents, particularly passports, identification cards, visas and driver's licenses, vehicle registration certificates, vehicle registration documents, corporate identification cards, health cards or other ID documents and also chip cards, payment means, particularly banknotes, bankers' cards and credit cards, waybills or other credentials. By contrast, "electronic documents" are computer-readable data, for example Word or PDF files, which can be provided with a digital signature.

When it comes to the safeguarding of electronic communication by means of asymmetric cryptographic methods, digital certificates are a tried and tested means for proving the authenticity and association of the cryptographic means with a specific person. Certificates are structured data which document the authenticity and/or further properties of the owner of a public key (signature check key) and confirm this by means of an independent credible authority (CSP). Certificates are generally available to a wide range of people so as to check the authenticity and validity of electronic signatures. A certificate can be associated with an electronic signature for example if the private key belonging to the public key has been used to generate the electronic signature to be checked. Since a CSP provides a certificate in association with a public key to the general public, a CSP allows the users of asymmetric cryptosystems to associate the public key with an identity (for example a person, an organization or an energy system). Depending on the level of security of the cryptosystem used, an electronic signature can therefore also be used to conclude legally binding agreements.

Asymmetric key pairs are used for a large number of cryptosystems and also play a key role in the signature of electronic documents. An asymmetric key pair consists of a private key, which is used to encrypt data and generally has to be kept secret, and a public key, which can be forwarded to third parties, for example a service provider and/or a CSP. The public key allows anybody to encrypt data for the owner of the private key, to check digital signatures of documents of said owner, or to authenticate said owner. A private key allows its owner to decrypt data encrypted by the public key or to produce digital signatures for electronic documents.

Digital signatures are used for the secure handling of business deals over the Internet and make it possible to check the identity of the contractual party and the authenticity of the exchanged data. To ensure this, a public key infrastructure is generally necessary, which confirms the validity of the used key by means of certificates.

The production of a digital signature, which will be referred to hereinafter merely as a "signature" or "electronic signature", is a cryptographic method, in which a further data value, which will be referred to as a "signature", is added to any data, for example an electronic document. By way of example, the signature may be an encrypted hash value of the electronic document. The particular feature of a signature lies in the fact that its authorship and affiliation to a specific person or authority can be checked by anybody.

Electronic data provided with a signature thus make it possible to definitively identify the author or the person who has signed this data and to check the integrity (lack of falsification by third parties) of the signed electronic information. A "qualified electronic signature" is a signature that, in accordance with the legal provisions within a field of law (for example in Germany in accordance with the provisions stipulated under paragraph 2 (3) of the Signature Act), meet the requirements of the electronic form and is thus suitable for replacement of the written form that is legally prescribed for some transaction forms. The terms "electronic signature" and "qualified electronic signature" are purely legal in nature. In practice and also in the present description of the invention however, these terms are used as synonyms for the purely technical term "digital signature".

Embodiments of the invention include a method for generating a certificate for signing electronic documents by means of an ID token. The method consists of the following steps:
1. Sending a transaction request for a user to carry out a transaction.
2. Checking whether the certificate is available on account of the sending of the transaction request, and, if this is not the case, executing the following steps:
3. Generating a first asymmetric key pair consisting of a first private key and a first public key by means of the ID token, wherein the ID token is associated with the user,
4. Storing the generated first asymmetric key pair in the ID token, wherein at least the first private key is stored in a first protected memory area of the ID token,
5. Transmitting the generated first public key to the first computer system, and
6. Generating the first certificate by the first computer system for the first public key.

These steps will be discussed and explained by way of example hereinafter.

1. Sending a Transaction Request for a User to Carry out a Transaction.

Example: a user, who for example would like to borrow a certain sum of money from an online bank, fills in an HTML form, which is provided from the bank via the Internet. In addition to his address data, he also provides data concerning the credit agreement, such as the amount and duration of the credit and repayment methods. The transaction request is transmitted to the bank's computer system (second computer system) by http request.

2. Checking Whether the Certificate is Available on Account of the Sending of the Transaction Request The availability of the certificate can be checked by the third computer system, that is to say by the user computer system, or by the second computer system, that is to say the service computer system. According to further embodiments, the check can also be carried out by the first computer system. If this check reveals that such a certificate for the signing of data by a user is not available, this certificate is then generated. The second computer system, for example a bank's computer system, receives the transaction request and sends the user a request to electronically sign data, for example a document. According to embodiments of the invention, the transaction request is sent from the third computer system to a second computer system and, in response thereto, the second computer system sends a signature request to the third computer system. The data to be signed may be an electronic document for example, for example a contractual document necessary to carry out the transaction. The data to be signed may also be the transaction request itself. The data to be signed may be sent from the second computer system to the third computer system during the course of the signature request. The signature request is received by the third computer system as a response to the sending of the transaction request. The signature request may be executed for example in such a way that the data transmitted from the user to the bank's second computer system are automatically incorporated into a blank electronic credit agreement form. The blank credit agreement form, which may be present example in the form of a formatted text file, filled in with the user's data can then be sent from the second computer system, for example in the form of an e-mail attachment, to the user together with the request to sign the electronically filled-in credit agreement. Said e-mail could thus contain, for example, a Word document or PDF document containing the data specified by the user. Alternatively, merely a request to sign an electronic credit agreement to be filled in by the user could be sent to the user, for example by e-mail, wherein a link to download a corresponding agreement template is contained in this e-mail.

Hereinafter, "signature request" means any type of request, transmitted electronically or otherwise, to sign data, of which the signing is necessary to carry out the transaction requested in the transaction request. The signature request contains a request to sign data, for example an electronic document, by the encryption of this data or a value derived therefrom, for example a hash value, using a private signature key. The private signature key forms an asymmetric key pair together with a public signature check key, wherein, for the public signature check key, a certificate issued by a CSP proves the authenticity of the sender and the lack of falsification of the signed data and the affiliation of the public key used for signing to the sender of the signed data. The signature request may already contain the data to be signed, or the signature request merely indicates that data needs to be signed in order to carry out the requested transaction. This data can be generated and/or stored by the user or can be transmitted to the user computer system.

If the check reveals that there is no suitable certificate available for the requested transaction, the following steps are executed:

3. Authentication of the User to the ID Token

According to preferred embodiments of the invention, the user of the ID token has to be authenticated to the ID token before certain functions specific to this ID token can be used. According to preferred embodiments of the invention, a user is authenticated by confirming that he can prove knowledge of a certain authentication datum, for example a password or a PIN. Depending on the embodiment, the ID token may provide a minimum length or minimum complexity for the password or the PIN, The user must manage the authentication data such that he alone knows the authentication data. According to further embodiments, the ID token is equipped with an initial transport PIN, which has to be replaced by the user with an operational signature PIN before the ID token is used for the first time to sign electronic documents.

According to further embodiments of the invention, the security of the authentication of the user with the ID token can be increased by using further security features. By way of example, the use of biometric features, for example the user's fingerprint, a key tap frequency specific to each user, an iris image or the like, may thus be necessary to authenticate the user to the ID token. According to further embodiments, the ID token may contain a PUK for unlocking authentication data. According to further embodiments, the authentication of a user to the ID token may require the input of what is known as a "card access number" (CAN), which identifies the user as the direct owner of the ID token.

According to further embodiments, the correct input of a second PIN to authenticate the user to the ID token may also be necessary, wherein the second PIN can only be input following successful input of the first PIN, wherein the second PIN is a signature PIN specified by the user. According to further embodiments of the invention, the signature PIN is reset by the user before each occurrence of data signing by means of the ID token.

According to one embodiment of the invention, the ID token contains functions for proving the identity of a user and also a signature function. According to this embodiment, the use of the ID token requires the successful input of the first PIN as proof of identity. If the ID token is also used by the user for signature purposes, the user must additionally correctly input a second PIN (the signature PIN), and thus unlock the signature function of the ID token.

The specific authentication data necessary for a particular embodiment of the invention is dependent on the security requirements of the respective ID token.

4. Authentication of a First Computer System to the ID Token

According to one embodiment of the invention, the first computer system is a computer system belonging to an officially certified trust center, particularly a trust center which is compliant with the Signature Act, and will be referred to hereinafter as the "ID provider computer system". By way of example, the ID provider computer system may be a computer system that belongs to a certification service provider (CSP), or a computer system belonging to a certification authority (CA). A certification authority (CA) is an issuer of certificates. A certification service provider (CSP) is an issuer of certificates and the respective services. These services include, for example, the issuing of blacklists, the management of a directory service, etc. A CSP forms a trustworthy authority that issues certificates and makes it possible to check the authenticity of digital signatures and to assign digital signatures securely to a user.

According to further embodiments of the invention, a secure communication channel must first be set up during the course of the authentication of the first computer system to the ID token. This is possible for example by using various asymmetric cryptographic protocols. According to a further embodiment, a secure communication channel is produced between the first computer system and the ID token. The connection between the ID token and the first computer system may preferably be set up in this case via a network, particularly the Internet.

According to one embodiment of the invention, the authentication of the first computer system to the ID token includes checking, by the ID token, whether the first computer system has read and/or write rights for the data memory of the ID token. If the ID token has a plurality of memory areas having different access rights, this step may also be executed a number of times for each individual memory area.

According to a further embodiments, the first computer system has at least one second certificate, which is used to authenticate the first computer system to the ID token. The second certificate contains a specification of the attributes for which the first computer system has read authorization and/or write authorization. The ID token checks, on the basis of this second certificate, whether the first computer system has the necessary read authorization for the read access to the attribute, before such a read access can be carried out by the first computer system.

ID tokens according to the invention, which are official identification documents, for example passports or identification cards, are particularly advantageous since one or more attributes can be read from a particularly trustworthy document. These attributes can be used to prove the identity of the user (function of the ID token as identity proof). However, these attributes can also be used to prove the affiliation of the user to a specific user group authorized for a service (for example proof of age function). It is also of particular advantage that central storage of the attribute is not necessary. The invention thus allows a particularly high level of trustworthiness for the communication of the attributes belonging to a digital identity, accompanied by optimum data protection with extremely convenient handling.

According to one embodiment of the invention, the step of authentication of the first computer system to the ID token can be initiated by a second computer system. By way of example, this initiation can be implemented on the basis of the second computer system providing a link to a corresponding function of the first computer system. Said link may thus refer, for example, to a function for producing a certificate provided by a server of a trust center via the Internet. By means of said function, the user can prompt the first computer system of the trust center to authenticate itself to the ID token associated with the user.

By way of example, the second computer system may be a server for providing an online service or another service, such as a banking service, or may be a service for ordering a product.

5. Generating a First Asymmetric Key Pair Consisting of a First Private Key and a First Public Key by the ID Token The ID token is associated with a user; that is to say the user has the option to identify itself to the ID token as the authorized user thereof, for example by means of a PIN and/or biometric data. By using suitable cryptographic algorithms to generate the asymmetric key pair, a reconstruction of the private key from the public key or from the encrypted or signed electronic document is ruled out. The algorithms for generating the asymmetric key pair are stored on the ID token and can be executed by the processor of the ID token.

By way of example, RSA methods, Rabin and ElGamal cryptosystems, or cryptographic algorithms based on elliptical curves can be used as encryption algorithms.

The asymmetric key pair generated by the ID token can be used for example to sign electronic documents. In this case, reference is often also made to a "signature key" in the case of the private key and to a "signature check key" in the case of the public key.

According to further embodiments of the invention, the step of checking whether a suitable first certificate is already present, which is valid for the requested transaction, also contains the check as to whether an asymmetric key pair affiliated with this certificate is present on the first protected memory area of the ID token. According to this embodiment, the first asymmetric key pair and the first certificate are only produced if no asymmetric key pair with affiliated certificate valid for the transaction is stored on the storage medium of the ID token.

If merely a first asymmetric key pair is stored on the storage medium of the ID token, the respective certificate of said first asymmetric key pair no longer being valid or not being valid for the requested transaction, a new first asymmetric key pair is thus generated and stored on the storage medium of the ID token or in suitable memory areas of this storage medium.

According to further embodiments of the invention, the total number of the first asymmetric key pairs stored on the ID token can be limited by the user to a specific number.

6. Storing the Generated First Asymmetric Key Pair on the ID Token, Wherein at Least the First Private Key is Stored on a Protected Memory Area of the ID Token The storage of the generated first private key in a first protected memory area of the ID token ensures that this key can only be used following successful authentication, to the ID token, of a user of the ID token and successful authentication of a third computer system by the ID token for signing electronic documents. According to preferred embodiments of the invention, the third computer system is a computer system associated with the user, for example his notebook or desktop computer. The user receives, via the third computer system, electronic documents for signing and can sign these documents by means of the first private key stored on the ID token. The requirement of double authentication (by the user and by the third computer system) to the ID token to produce an electronic signature with the private key ensures that the keys stored in the ID token, particularly first private keys, cannot be read by unauthorized parties and used to sign electronic documents.

7. Transmitting the Generated First Public Key to the First Computer System

The first computer system receives the generated first public key from the ID token. According to preferred embodiments of the invention, this occurs via a secure communication channel, which for example is formed by end-to-end encryption of the data transmission between the ID token and the first computer system. In this case, the authenticity of the read first public key is provided, at least, by the fact that the data transmission takes place over a secure communication channel, for example what is known as a "secure messaging" communication channel.

8. Generating the First Certificate with Validity for the Requested Transaction by the First Computer System for the First Public Key.

The first computer system, for example a trust center, then issues a first digital certificate, for example a qualified first digital certificate, for the read public key. According to embodiments of the invention, the issued first digital certificate is provided so that it can be retrieved publicly. It is thus possible for any third parties to associate the key with the user with which the ID token is associated and to check the validity of the public key and the validity of the signatures that have been produced using private keys associated with the public key.

According to further embodiments of the invention, the first digital certificate thus generated can be stored on the protected or a further memory area of the ID token.

In some embodiments of the invention, a copy of the first digital certificate can be transmitted via the secure communication channel to the ID token, where it is then stored on the storage medium of the ID token.

Signing an Electronic Document

According to further embodiments of the invention, the data to be signed can be signed electronically by means of the generated first asymmetric key pair in that the data to be signed, for example an electronic document to be signed, are first received by a third computer system of the user.

By way of example, in this and further embodiments, the third computer system is a personal computer, a portable computer, such as a laptop or palmtop computer, a notebook, a netbook, a personal digital assistant, a mobile telecommunication appliance, particularly a smart phone, or the like. Generally, the third computer system is associated with the user of the ID token, although this is not necessarily the case.

In a further step, the third computer system is authenticated to the ID token. In further embodiments of the invention, the third computer system can be authenticated to the ID token based on the cryptographic PACE authentication protocol developed by the German Federal Office for Information Security (BSI).

According to further embodiments, the method according to the invention for signing an electronic document includes the following steps: receiving the data to be signed from a second computer system by a third computer system, authenticating the third computer system to the ID token, authenticating the user to the ID token, sending, to the ID token by the third computer system following successful authentication of the user and the third computer system to the ID token, the data to be signed or a value derived therefrom and a command to sign the data sent to the ID token, signing the sent data with the first private key by the ID token and transmitting the signed data from the ID token to the third computer system. From here, the signed data can be forwarded for example to a second computer system of a service.

By way of example, the user can be authenticated to the ID token by inputting a first PIN, which is associated with the user. According to further embodiments of the invention, the user is authenticated to the ID token by inputting a first and at least one second PIN, wherein the first and the least one second PIN are associated with the user, and wherein the at least one second PIN can only be input following successful input of the first PIN. Embodiments of the invention in accordance with which the ID token is formed as a security document, for example as an official identification card or passport, have a first PIN for example for authentication of the user to the ID token, also known as an eID PIN. Said embodiments also have at least one further second PIN (what is known as an "eSign PIN" or "signature PIN"), which can only be input following successful input of the eID PIN, and, once input successfully, unlocks the signature function of the ID token.

According to further embodiments of the invention, the method further includes the steps of transmitting the signed data and the first public key from the ID token to the third computer system, transmitting the signed data and, depending on the embodiment of the invention, also the first public key from the third computer system to the second computer system, and checking the signature of the signed data by means of the second computer system in that the second computer system for example sends the first public key in a certificate check request to the first computer system and requests from the first computer system the first certificate affiliated to the public key.

The first computer system, which makes publicly available the first certificate associated with the first public key of the first asymmetric key pair, can store the first certificate as a hash map, for example together with the first public key associated with this first certificate, such that an affiliated first certificate can be retrieved very quickly for each known first public key. This allows any third party, for example a department store or banking institute, to check the authenticity and validity of signed electronic documents by means of their associated first public keys by requesting an affiliated first certificate from the first computer system.

The third computer system, for example a notebook belonging to the user, typically has a conventional Internet browser installed on it, with which the user can open a web page of the second computer system (for example a bank's web page) and can thus initiate a transaction request. The transaction request may be an order for a service or a product for example.

According to further embodiments of the invention, the second computer system then specifies at least one first data value. According to embodiments of the invention, this first data value is associated with the data to be signed, for example an electronic document to be signed, and for example contains the user's customer number, an order number for the requested transaction, an identifier of the operator of a computer system that sends the signature request, for example a partner number, an identifier of the computer system that sends the signature request, for example a MAC address, or a document number for a requested electronic document. The first data value may also be a value derived from said values, for example a hash value of the customer number, order number or document number, or a hash value of the content of the entire electronic document. If the electronic document contains a transaction number, this alone guarantees with a very high likelihood that the derived hash value is a one-off, document-specific hash value. The first data value is used by the first computer system to limit the validity of the produced first certificate, and the first data value is specified for the implementation of the requested transaction. According to embodiments of the invention, the validity of the certificate generated by the first computer system is thus restricted since the produced certificate additionally contains the data value, and this value integrated into the certificate is considered during the certificate check.

According to further embodiments, the produced first certificate is a transaction-bound certificate, of which the validity is restricted to the requested transaction. According to embodiments of the invention, the certificate is bound to the transaction since the first data value is specified in response to the sending of a transaction request and is a data value which is a component of the data to be signed during the course of the action to be carried out or is identical to the data to be signed or is derived from the data to be signed. By way of example, the first data value may be a document number or transaction number, which is only produced specifically for the requested transaction once a transaction request of a third computer system to a second computer system has been received by the second computer system. The first data value is transmitted from the second computer system to the first computer system during the course of the certificate transmission or at another opportunity, and is then integrated by the first computer system into the certificate to be produced. As a result of the integration, the first data value is a component of the specified certificate. The second computer system is thus able to analyze, during the course of checking of a digital signature, whether this first data value is a component of the transaction-bound first certificate validating the public key affiliated to the analyzed signature. Since, according to said embodiments, the document number, possibly in combination with further data such as the name of the service, is a one-off document number for the requested transaction, it is thus possible to produce transaction-bound certificates.

According to further embodiment of the invention, the first data value may also contain a period of time for which a certificate to be issued is to be valid. The first data value may alternatively or additionally specify a particular line of business and/or particular legal authorities or types of transaction for which the first certificate to be issued is to be valid. Said first data value may also consist of a combination of said values.

The first data value has the function of limiting the validity of the first certificate issued by the first computer system on the basis of the first data value. Depending on the characteristic features and content of the first data value, the certificate to be issued may thus be restricted to a particular period of time and/or to one or more particular service providers and/or to one or more particular documents. By combining a number of restricting specifications, it is possible for example to issue a certificate that is only valid for a particular electronic document having a particular document number, and in addition only within a limited period.

By way of example, digital certificates may contain information concerning the user associated with a certificate. The information concerning the user may relate to a natural person or a legal entity. The details or information contained in a digital certificate may also contain, for example, the name of the certificate issuer (CSP), information concerning the rules and procedures under which the certificate has been issued and/or information concerning the period of validity of the certificate. Said details or information may contain the public key, for which the certificate provides information, and/or the name or another clear indication of the owner of the public key, as well, as various other pieces of information concerning the owner of the public key. A digital certificate may also contain a digital signature of the authority issuing the certificate via one or more of the aforementioned pieces of information. Since, according to preferred embodiments of the invention, a transaction-specific value, for example a document number, is contained as a further attribute in the certificate, it is possible for example for a service provider, which provides an electronic document to be signed, to check whether the certificate belonging to a received signed document also actually contains this document-specific information. If this is not the case, the certificate and be affiliated signed document are considered to be invalid.

This first data value determined by the second computer system is sent from the second computer system to the first computer system for the purpose of producing a certificate of limited validity. Depending on the embodiment of the invention, this may take place with or without the intermediate intervention of the third computer system. In the former case, the user can specify the desired first computer system to the second computer system, for example by inputting the URL of the first computer system a web page of the second computer system from the third computer system. In the latter case, further data in addition to the first data value transmitted from the second ccomputer system to the first computer system has to be sent to the first computer system, thus allowing the first computer system to associate the received first data value with a first digital certificate to be produced.

According to one embodiment of the invention, the user's transaction request to the second computer system contains details of an identifier, wherein the identifier identifies the first computer system. By way of example, the identifier is a link, for example a URL of the first computer system.

According to one embodiment of the invention, the second computer system receives a transaction request from the third computer system and, after receiving this transaction request, sends a signature request to the third computer system. According to further embodiments of the invention, this signature request contains data, of which the signing by a public key associated with the user is necessary for the implementation of the requested transaction, for example one or more electronic documents to be signed or details concerning one or more electronic documents to be signed. By way of example, these details may be in the form of a link to an Internet page, which provides the electronic documents to be signed. According to further embodiments of the invention, the signature request further contains the first data value for limiting the validity of the first digital certificate to be issued for the requested transaction. However, this data value can also be transmitted with another message from the second computer system to the first computer system via the third computer system, or directly to the first computer system without intermediate intervention of the third computer system, According to further embodiments, the first data value is not sent from the second computer system to the third computer system during the course of the signature request. Once the signature request has been received by the third computer system, a check is first carried out to establish whether an asymmetric key pair, which comprises a public key with which a certificate is associated and which confirms the validity of the public key for the requested transaction, is stored in the ID token associated with the user. If a valid certificate is not present, a message is sent from the third computer system to the second computer system and contains the information that a certificate usable for the requested transaction is not present. After receiving this message by the second computer system, said second computer system sends the first data value to the third computer system.

The third computer system receives the first data value and authenticates itself to the ID token. Following successful authentication of the first computer system and the user associated with the ID token, at least the first data value is transmitted to the ID token. According to embodiments of the invention, the first computer system sends a command to generate a first asymrumetric key pair. The first asymmetric key pair is generated by program instructions of the ID token, which can be executed by a processor. The generated first public and first private key, which together form a first asymmetric cryptographic key pair, are stored on the ID token in suitable memory areas of the storage medium. At least the first public key and the first data value are transmitted to the first computer system. The first computer system issues a first certificate for the received first public key. The validity of the generated first certificate is restricted in accordance with the specifications of the received first data value. According to further embodiments of the invention, the generated first certificate can be transmitted back to the ID token and stored thereon.

Should a corresponding first asymmetric key pair and affiliated certificate valid for the requested signature already be stored on the ID token, there is no generation of a first asymmetric key pair and affiliated first certificate. In this case, a notification that a valid asymmetric key pair is already provided on the ID token is sent to the first computer system.

The secure communication channel between the ID token and the first computer system can then be separated.

As a result of the described steps, it is ensured that at least one first asymmetric key pair, which is suitable for the signing of electronic documents, is located on the ID token. The following further steps are also necessary in order to sign a document with the aid of the first private key:

The third computer system must authenticate itself to the ID token as being authorized to initiate an electronic signature. Furthermore, the user must authenticate itself to the ID token, in accordance with one of the above-described authentication methods, as being authorized to produce a signature.

The third computer system sends to the ID token the data to be signed or a value derived therefrom, for example a hash value of an electronic document to be signed, as well as a command to sign the sent data.

According to further embodiments, the data to be signed may also be sent to the ID token already during the step of checking for the presence of suitable first asymmetric keys on the ID token.

The ID token has suitable algorithms for encrypting the received data to be signed using the private key of the first asymmetric key pair. The data to be signed in order to carry out the transaction are signed by the encryption of the data transmitted to the ID token with the private key of the first asymmetric key pair.

In the next step, the data signed by the ID token are transmitted to the third computer system. According to embodiments of the invention, the public key of the first asymmetric key pair is also transmitted to the third computer system during the course of this transmission process. The third computer system forwards to the second computer system the signed data received from the ID token and, according to some embodiments, also the affiliated first public key. According to further embodiments of the invention, an error message is forwarded from the ID token to the third computer system in the event of a failure of the signing process.

According to further embodiments of the invention, the user can supplement the signed data with further data before it is forwarded to the second computer system.

Once the signed data and, where applicable, the affiliated first public key have been received by the second computer system, the second computer system has the option to check the authenticity and validity of the signature of the received signed data. To this end, the second computer system may send a request to check the validity of the first certificate associated with the first public key, or what is known as a "certificate check request", to the first computer system, wherein this request at least contains the received public key.

The "certificate check request" contains the public key associated with the certificate to be checked. The association of a public key with a certificate means that the private key used to sign the data to be signed and the public key form an asymmetric cryptographic key pair, wherein the certificate associated with the public key confirms properties of the public key. The receipt of the certificate check request by the first computer system causes the first computer system to check whether a first certificate is available that is associated with the public key that was contained in the check request. Should such a first certificate be found, this is sent to the second computer system. Since details regarding validity as well as personal data concerning the user, which can be used to authenticate said user, are contained in this first certificate, the second computer system can check whether the provided signature is valid for the current transaction and/or the current period and/or the current document.

Embodiments of the ID Token as an Electronic Identification Card or Passport

Following successful authentication of the first computer system to the ID token, the first computer system may read at least one attribute from a data memory of the ID token. The at least one attribute may be a detail regarding the identity of the user associated with the ID token, in particular regarding the "digital identity" thereof. By way of example, the following attributes: surname, first name and/or address, are read by the first computer system. However, only an individual attribute may also be read for example, which is not used to determine the identity of the user, but for example to check the authorization of the user to access a specific online service, for example the age of the user, if said user attempts to access an online service that is reserved for a specific age group, or another attribute which documents the affiliation of the user to a particular group authorized to use the online service. By combining proof of identity of a user or at least the proof of particular attributes of the user, such as his age, with a secure signature function in the same ID token, a particularly user-friendly and multifunctional ID token is created, which fulfills a large number of requirements that may play a role when carrying out electronic transactions.

By way of example, the user may open an account online, for which purpose attributes which contain the identity of the user or which associate the user with a specific group of people are transmitted from the first computer system, that is to say a trust center for example, to the second computer system—a bank's computer system for example. According to embodiments of the invention, the transmission of attributes, which are reliably ascribable to a specific user, is advantageously supplemented by the method according to the invention to generate electronic certificates and to sign electronic documents using the same ID token. According to embodiments of the present invention, it is thus possible by means of an ID token to conclude legally binding agreements, for example with a bank, so as to open an account, and also to sign electronic documents, such as a credit agreement, with the corresponding legally binding consequences.

According to one embodiment of the invention, the attributes read from the ID token are initially transmitted from the first computer system to the third computer system of the user.

Embodiments in which the ID Token is not an Official Document (for Example is not an Electronic Identification Card or Passport)

According to further embodiments of the invention, the ID token according to the invention may also have been acquired commercially freely. In this embodiment, the ID token has no official identification function. In some embodiments of the ID token, it is still possible however to use said ID token to authenticate the affiliated user or owner. For these embodiments, it must also be possible with IDs token acquired commercially for the owner to be authenticated definitively and reliably to the ID token, since a signature issued by an ID token which cannot be ascribed definitively and reliably to a specific user is very unsafe. With embodiments, available commercially freely, of an ID token according to the invention, a personal appearance before an authorized certification body, a written request sent by post, or for example a request by phone with specification of an authentication datum by phone is necessary. In any case, the user of the purchased ID token must therefore authenticate himself, at least once, in any form to an authorized authority. Various methods for one-time authentication of the user, for example when purchasing an electronic appliance, are known example from sales of mobile communication appliances, such as mobile phones. By way of example, authentication may be carried out at the till of a shop when purchasing the ID token according to the invention by presenting an identification card. The user then receives access data from said authority so as to be able to authenticate himself to the ID token in the future, for example a first initial transport PIN, a password, a second certificate or other suitable data, which enable the user to authenticate himself to the ID token.

Whereas, according to the prior art, a certificate is generally issued once or for a long period of time and the affiliated asymmetric key pair for generating (qualifying) electronic signatures has to be safeguarded for just as long, according to embodiments of the invention the production of (qualifying) electronic signatures and the production of the key material necessary therefor is enormously facilitated, and therefore the generation of certificates and keys that are only valid to a very limited extent does not lead to an additional technical outlay for the user. According to embodiments of the present invention, only one-time authentication to an authorized authority is necessary, for example when purchasing the ID token, wherein the user is provided with secure access data for definitive authentication to the ID token. The user can then produce new certificates time and time again, without media disruption, for a wide range of transactions and can also delete or invalidate these certificates as necessary.

According to preferred embodiments, the ID token does not have a signature key designed for the signing of electronic documents when said ID token is issued for the first time to the user and new owner. If the user of the ID token does not use said ID token for the issuing of electronic signatures, there is also no asymmetric key pair or certificate on the ID token, which could be misused by third parties. If the user later generates first asymmetric key pairs for signature purposes, these keys are thus likewise secure against misuse, since they are stored on a protected memory area of the ID token and, according to preferred embodiments of the present invention, the public key is also associated with a first certificate, which only has a very limited period of validity. According to embodiments of the invention, the validity period is restricted for example to a single transaction, to a single electronic document to be signed, or to a very short period at least necessary to carry out the transaction.

According to preferred embodiments of the invention, a plurality of first asymmetric key pairs and affiliated first certificates may be located on the storage medium of the ID token. Since a first certificate may restrict the validity of a first asymmetric key pair to a particular period, a particular service provider, or a particular type of document, the existence of a number of first key pairs valid for different transaction types and affiliated first certificates is advantageous. By way of example, an ID token according to the invention on the protected memory area could thus contain a first private key, of which the affiliated first certificate is specifically only authorized for the signing of electronic documents from this bank. Furthermore, said ID token could also have stored a further first private key for signing a hire-purchase agreement document for a purchased household appliance, wherein the first certificate belonging to this first key is valid specifically only for this one agreement document having a particular transaction number.

Deleting and Blocking of Key Pairs and Certificates

According to further embodiments, the user can delete the second PIN, including one or more first asymmetric key pairs and first certificates, which have been generated with use of this second PIN and stored on the storage medium of the ID token. Depending on the specification and input of a new second PIN (the signature PIN), the user can then generate new first asymmetric key pairs and affiliated certificates, as described before. The possibility of deleting existing second PINs and affiliated first asymmetric key pairs and certificates and of replacing these with new ones constitutes an additional security advantage, since, should the user suspect that another user may be in receipt of the private key without authorization, he can delete the affiliated key pair and certificate at any time and replace them with a new key pair and affiliated certificate.

According to embodiments of the present invention, the user of the ID token thus has the opportunity to delete a previously generated first asymmetric key pair and the opportunity to delete a first certificate associated with the previously generated first asymmetric key pair on the ID token. According to preferred embodiments, the deletion is implemented in this case by program routines of the ID token.

A previously specified second PIN may also be deleted if necessary according to further embodiments and replaced by a new second PIN to be specified by the user.

According to further embodiments, the user of the ID token has the opportunity to send to the first computer system a request to block the first certificate. Once the authenticity of this request has been checked by the first computer system, the first certificate to which the request relates is blocked by the first computer system. According to further embodiments, this request can be sent automatically from the ID token to the first computer system once the user has given a command to delete the first certificate, of which a copy is stored on the ID token.

According to further embodiments, the second computer system, that is to say for example the computer system of a service provider such as a bank or a department store, is also authorized to send a request to the first computer system to block a particular first certificate associated with a user and to prompt said first computer system to block the first certificate specified in this request. In this case, the first certificate, to which the block request relates, must generally be the property of the service provider, so as to prevent unauthorized third parties from being able to randomly block a first certificate. By way of example, a service could thus prompt, at its own cost, the issuing of a first certificate for a customer, wherein the service is authorized to block this first certificate, although it is associated with a particular customer and is used by said customer for signature purposes when carrying out business transactions with the service.

Further embodiments of the method according to the invention also include the step of transmitting the generated first certificate from the first computer system to the ID token and of storing the first certificate on the ID token.

Further embodiments of the method according to the invention also include the following steps:
  deleting a previously generated first asymmetric key pair from the ID token and/or
  deleting a first certificate belonging to the previously generated first asymmetric key pair from the ID token, if said certificate has been stored on the ID token, and/or
  blocking, by the first computer system, the first certificate generated by said first computer system, said certificate being associated with the deleted asymmetric key pair,
wherein the previously generated asymmetric key pair and/or the first certificate is/are to be deleted from the ID token.

Further embodiments of the method according to the invention also include the following step:
  sending the at least one attribute read from the ID token by the first computer system from the first computer system to the third computer system, where the at least one attribute is forwarded to the second computer system once released by the user.

According to embodiments of the method according to the invention, the at least one attribute contains information concerning the identity of the user or the affiliation thereof to a user group.

According to further embodiments of the method according to the invention, the at least one attribute, together with the first public key, is read from the ID token by the first computer system and is transmitted to the first computer system. According to preferred embodiments of the method, the public key and the at least one attribute are transmitted via a protected connection between the ID token and the first computer system, for example a connection between the ID token and the first computer system protected by end-to-end encryption. These embodiments are advantageous since the transmission of the public key, for which a certificate has not yet been issued, via a protected connection to the first computer system ensures that a hacker is unable to read in plain text or falsify the transmitted data by recording, manipulating and analyzing the communication between the ID token and the first computer system (for example "man-in-the-middle attacks").

According to further embodiments of the method according to the invention, the at least one attribute read by the first computer system is integrated into the first certificate generated by the first computer system for the public key, such that the at least one attribute is a component of the first certificate. The at least one integrated attribute can be used, for example, to specify the name of the owner of the public key in the first certificate.

These embodiments are advantageous since a user is provided with a secure signing method as well as a method that allows the user to prove rights to user-based properties or authorizations for example, using the same technical platform. The attributes may specify, for example, particular properties of the user, such as the affiliation thereof to a particular user group, the user's name, his place of residence, etc. Since one or more of these attributes are read from a protected memory area of the ID token together with the public key and the read attributes are made publicly available to third parties as a component of the certificate, it is possible to prove the ascription of the properties specified in the attributes to the user in a manner that is secure with regard to third parties. By way of example, the name of the user of the ID token may thus be stored as an attribute in the ID token. If the first computer system reads this attribute from the ID token when producing the first certificate, the first computer system may thus use the name of the user given in the attribute to specify the name of the owner of the public key. According to further embodiments, the reading of the at least attribute in order to integrate the attribute into the produced first certificate requires the authorization of the user. Alternatively or additionally to the integration of the at least one read attribute into the first certificate, the at least one read attribute can also be transmitted from the first computer system to the second computer system.

Further embodiments of the method according to the invention also include the following steps:
  signing the at least one attribute read from the ID token by the first computer system,
  transmitting the signed attribute from the first computer system to a second computer system.

Further embodiments of the method according to the invention also include the fact that the read access of the first computer system is implemented so as to read from the ID token the one or more attributes specified in an attribute specification.

Further embodiments of the method according to the invention also include the following steps:
  specifying one or more attributes by the second computer system,
  sending the attribute specification from the second computer system to the first computer system,
  wherein the read access of the first computer system is implemented so as to read from the ID token the one or more attributes specified in the attribute specification.

An attribute specification is, in this case, a specification of one or more attributes, which are to be read from the ID token.

Further embodiments of the method according to the invention also include, following successful authentication of the user and of the first computer system to the ID token, the step of read access of the first computer system to the at least one attribute stored in the ID token to transmit the at least one attribute, once signed, to a second computer system.

Further embodiments of the method according to the invention further include the step of authenticating the first computer system to the ID token with the aid of a second certificate of the first computer system, wherein the second certificate contains a specification of the attributes stored in the ID token, for which the first computer system is authorized for read access.

According to further embodiments of the invention, the first computer system authenticates itself to the ID token based on a challenge response protocol.

According to further embodiments of the invention, the ID token checks the read authorization of the first computer system for the read access to at least one of the attributes with the aid of a second certificate.

According to further embodiments of the method according to the invention, the attributes specified in the attribute specification are read, together with the public key, from the ID token by the first computer system. The first public key and the at least one attribute can be read jointly during the course of a certificate request for example. A certificate request is a request to an ID provider computer system to issue a certificate for a public key.

According to further embodiments of the invention, once the first certificate has been produced by the first computer system and once the produced first certificate has been transmitted to the ID token, the first public key is transmitted from the ID token to the third computer system. The third computer system may transmit the first public key to the second computer system, for example together with the signed data, so that the second computer system can check the validity of the signature. According to embodiments of the invention, the first public key can be transmitted as a component of the first certificate from the ID token to the third computer system, and from the third computer system to the second computer system.

According to further embodiments, the read attributes are transmitted from the first computer system to the second computer system.

Further embodiments of the method according to the invention include the fact that the request contains an identifier for identifying the first computer system by the second computer system, wherein the attribute specification is transmitted from the second computer system to the first computer system without intermediate intervention of the third computer system.

According to further embodiments of the method according to the invention, the public key and/or the at least one attribute is/are transmitted from the ID token to the first computer system via a protected connection between the ID token and the first computer system, wherein the protected connection may be based for example on an end-to-end encryption.

In a further aspect, the invention relates to a computer program product, particularly a digital storage medium, containing executable program instructions for carrying out a method according to the invention. In particular, the digital storage medium may be a non-volatile storage medium, for example a CD-ROM, a flash drive, or a magneto-optical memory, etc.

In a further aspect, the invention relates to an ID token, which has means for generating a first asymmetric key pair consisting of a first private key and a first public key. This ID token further has a storage medium comprising at least one protected memory area. The first asymmetric key pair generated by the ID token is stored in the storage medium of the ID token, wherein at least the first private key is stored in a protected memory area of the ID token. According to embodiments of the invention, the ID token further has means for authenticating a user, associated with the ID token, to the ID token, means for authenticating a first computer system to the ID token, and means for setting up a protected connection to the first computer system, via which the first computer system can read the generated first public key from the protected memory area, wherein, according to embodiments of the invention, a necessary prerequisite for the generation of the first asymmetric key pair by the ID token is the successful authentication of the user and of the first computer system to the ID token.

In addition to the authentication of the first computer system to the ID token, as is known per se for example as "extended access control" for machine-readable travel documents (MRTDs) and as is specified by the international aviation authority ICAO, the user thus has to authenticate himself to the ID token. By way of example, successful authentication of the user to the ID token unlocks the latter, so that the further steps, namely the authentication of the first computer system to the ID token and/or the setup of a protected connection for reading the public key generated by the ID token, can take place.

According to one embodiment of the invention, the ID token has means for end-to-end encryption. This allows the connection between the ID token and the first computer system to be set up via a third computer system of the user, since the user cannot make any changes to the data transmitted via the connection on account of the end-to-end encryption.

According to further embodiments of the invention, the ID token is formed as an electronic appliance, particularly a USB stick, or a document, particularly a value document or security document. By way of example, a value document or security document may be an electronic identification card or passport issued by an authority.

According to further embodiments, a connection can be set up between the third computer system and the ID token. Should the ID token be formed as a USB stick, the connection can be set up for example in the terminal of the ID token to a USB interface of the third computer system.

According to further embodiments, a card reader for example can be used for the connection to an ID token formed as a smart card. According to further embodiments, the ID token formed for example as a chip card comprising an RFID chip can also be read contactlessly.

According to further embodiments, the ID token has a protected memory area for storing at least one attribute, wherein a necessary prerequisite for reading the least one attribute from the ID token by the first computer system is the successful authentication of the user and of the first computer system to the ID token.

According to further embodiments of the invention, the at least one attribute is transmitted from the ID token to the first computer system via a connection protected by end-to-end encryption.

According to further embodiments of the ID token, the user is authenticated to the ID token for signing the data to be signed by inputting a first and a second PIN, wherein the first PIN is associated with the user and the second PIN can only be input following successful input of the first PIN. According to further embodiments, the ID token has means for deleting a second PIN already stored on the ID token and for storing a second PIN newly specified by the user before a signing step.

In a further aspect, the invention relates to a first computer system comprising means for reading a first public key via a secured connection via a network from the ID token, wherein the first public key and a first private key form a first asymmetric key pair, wherein the generated first key pair is associated with the user. A first computer system according to the invention further has means for authentication to an ID token, means for receiving a first data value of a second computer system, and means for generating a first certificate for the received first public key, wherein the validity of the first certificate is determined by the received first data value, and wherein the first certificate is associated with the user.

According to further embodiments of the first computer system according to the invention, a prerequisite for the generation of the first certificate, which assigns the first public key generated by the ID token to a user, is the successful authentication of a user and of the first computer system to the ID token. The first computer system according to the invention further has a processor and a computer-readable, non-volatile storage medium for storing program instructions, as well as one or more first certificates.

Further embodiments of the first computer system have means for receiving a request to block a first certificate, and means for checking whether the request to block the first certificate originates from the operator of the second computer system, wherein the first computer system only executes the requested blocking of the first certificate if the request for blocking originates from the operator of the second computer system.

According to further embodiments of the first computer system, the request for blocking originates from the operator of the second computer system if a first identifier of the requestor matches a second identifier, which is a component of the certificate to be blocked, and wherein the second identifier, which is a component of the certificate to be blocked, is a first data value, wherein the first data value has been generated by the second computer system for the purpose of producing the first certificate in response to a transaction request by a user, and wherein the first data value has been recorded by the first computer system as a component of the first certificate to be produced when producing the first certificate.

According to further embodiments of the first computer system, said system contains means for receiving an attribute specification via a network, wherein the attribute specification specifies at least one attribute, as well as means for reading at least one attribute from the ID token via a protected connection, wherein the reading of the least one attribute presupposes that a user associated with the ID token and the first computer system have been authenticated to the ID token.

According to further embodiments of the first computer system, said system contains means for generating a request to the user for authentication to the ID token on account of the receipt of the attribute specification.

According to further embodiments of the first computer system, said system contains means for receiving the attribute specification from a second computer system, wherein the attribute specification specifies at least one attribute to be read from the ID token, means for reading the least one attribute specified in the attribute specification from the ID token, and means for sending the at least one attribute read from the ID token to a third computer system for forwarding to the second computer system.

According to further embodiments of the first computer system, said system contains means for signing the at least one attribute transmitted from the ID token to the first computer system, and means for sending the at least one signed attribute to a third computer system or a second computer system.

According to further embodiments of the first computer system, said system contains a plurality of second certificates of different read rights, wherein the computer system is designed to select, on account of the receipt of the attribute specification, at least one of the second certificates, which has sufficient read rights to read the attributes specified in the attribute specification.

According to further embodiments of the invention, the first computer system contains means so as to read from the ID token at least one attribute together with the public key. The first public key and the at least one attribute can be read jointly, for example during the course of a certificate request to the first computer system. According to further embodiments of the first computer system, only those attributes that are specified in an attribute specification are read from the ID token.

According to further embodiments of the first computer system, the first computer system has means for reading the public key and/or the least one attribute stored in the ID token to transmit the read first public key and/or the least one attribute from the ID token to the first computer system. According to further embodiments, the transmission of the read public key and/or of the at least one attribute stored in the ID token takes place via a protected connection, wherein the protected connection is formed between the ID token and the first computer system, wherein the protected connection may be based for example on an end-to-end encryption.

According to embodiments of the first computer system, said computer system further has means so as to integrate the at least one read attribute into the certificate to be produced for the first public key, such that that the at least one attribute is a component of the first certificate. By way of example, it is thus possible to specify by name in the first certificate the user associated with the first public key for which the first certificate has been produced.

Blocking of the Produced First Certificate by the First Computer System

According to one embodiment of the invention, the first computer system may also contain means for receiving a request to block the first certificate. Furthermore, this computer system may contain means for blocking the first certificate after checking that the request originates from the user associated with the first certificate. According to embodiment of the present invention, this request can be proven as originating from the user associated with the first certificate as a result of authentication of the user to the ID token and by sending to the first computer system the request to block the certificate belonging to the first public key of the ID token by means of the ID token.

According to a further embodiment of the first computer system according to the invention, the means for receiving a request to block the first certificate may also be suitable for receiving requests to block a first certificate associated with a user, wherein the request is sent from a second computer system, and wherein the authority associated with the second computer system is the owner of the first certificate to be blocked. According to these embodiments of the invention, the request to block a certificate associated with a user may thus also be sent to the first computer system by a second computer system. According to these embodiments, the first computer system thus also has means for receiving a request by a second computer system to block a first certificate, and means for blocking the first certificate to be blocked after checking that the request from the second computer originates from an authority which is the owner of the first certificate to be blocked.

According to embodiments of the first computer system according to the invention, once a first data value has been received, the first computer system inserts this first data value into the first certificate to be produced such that the first data value becomes a machine-readable and/or plain text component of the produced first certificate. According to preferred embodiments, this first data value is specified by a second computer system. According to further preferred embodiments, this first data value is specified by a second computer system in response to receiving a transaction request.

Embodiments of the invention make it possible to check the validity of the certificate by the second computer system, since the first computer system integrates the first data value specified by a second computer system into the certificate produced in order to carry out the requested transaction. The second computer system can check during the course of the certificate check whether the first data value, which the second computer system has specified, matches the data value contained in the certificate of a public key, wherein the certificate is only considered to be valid if the compared values match.

According to embodiments of the first computer system, said computer system further has means so as to integrate the first data value into the first certificate when producing the first certificate, such that the first data value is a component of the first certificate. By way of example, the first data value may specify the name of the operator of the service computer system. According to embodiments of the invention, as a result of the integration of the first data value into the first certificate by the first computer system, the first data value may identify the owner of the certificate, said owner bearing the costs of the production of the certificate, and/or the authority that is authorized to block the certificate.

According to further embodiments, the authentication of the third computer system to the ID token may also be necessary before setting up the secure connection. By way of example, the secure connection may be used to transmit a command to generate the first asymmretric key pair from the first computer system to the ID token and to transmit the first public key generated by the ID token to the first computer system, and, where necessary, also to transmit the first certificate issued by the first computer system and belonging to the first public key to the ID token.

Signature and Certificate Checking

According to one embodiment of the invention, the first computer system has one or more certificates, which are each associated with different first public keys and certify the authenticity and validity of the signatures generated thereby. After receiving a request to check the validity of a first public key (certificate check request), which also contains the public key with which an electronic signature has been made, the first computer system selects the certificate associated with this public key and sends it to the requesting second computer system. According to said embodiments, the first computer system also has means for receiving a request from a second computer system to check the validity of the first certificate, wherein the request at least contains the public key associated with the first certificate to be blocked.

According to one embodiment of the invention, the first computer system receives an identifier of the second computer system together with the certificate check request. With the aid of the identifier, the first computer system identifies the second computer system, which the checking service would like to use, so as to certify this service with respect to the second computer system.

According to further embodiments, once the data to be signed have been signed, the signed data are transmitted from the ID token to the third computer system. In addition, the first certificate or the first public key is transmitted from the ID token to the third computer system. According to preferred embodiments, the public key is a component of the first certificate and is transmitted therewith. The signed data and the first public key are then transmitted from the third computer system to the second computer system, wherein the public key can be transmitted as a component of the certificate. The second computer system can then check the validity of the first certificate affiliated to the public key. If the first certificate has not been transmitted from the third computer system to the second computer system, the first certificate can be requested from the first computer system by the second computer system.

Figure 2:
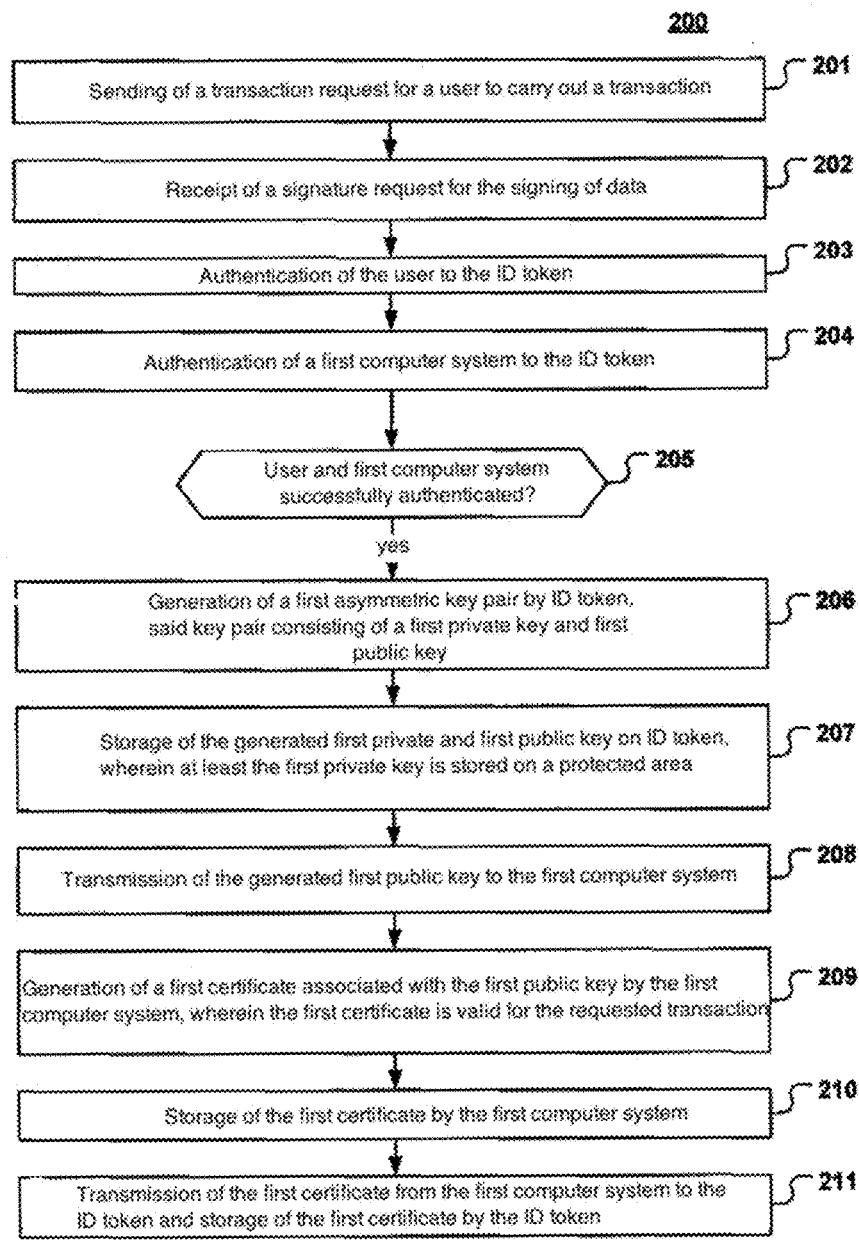
Figure 3:
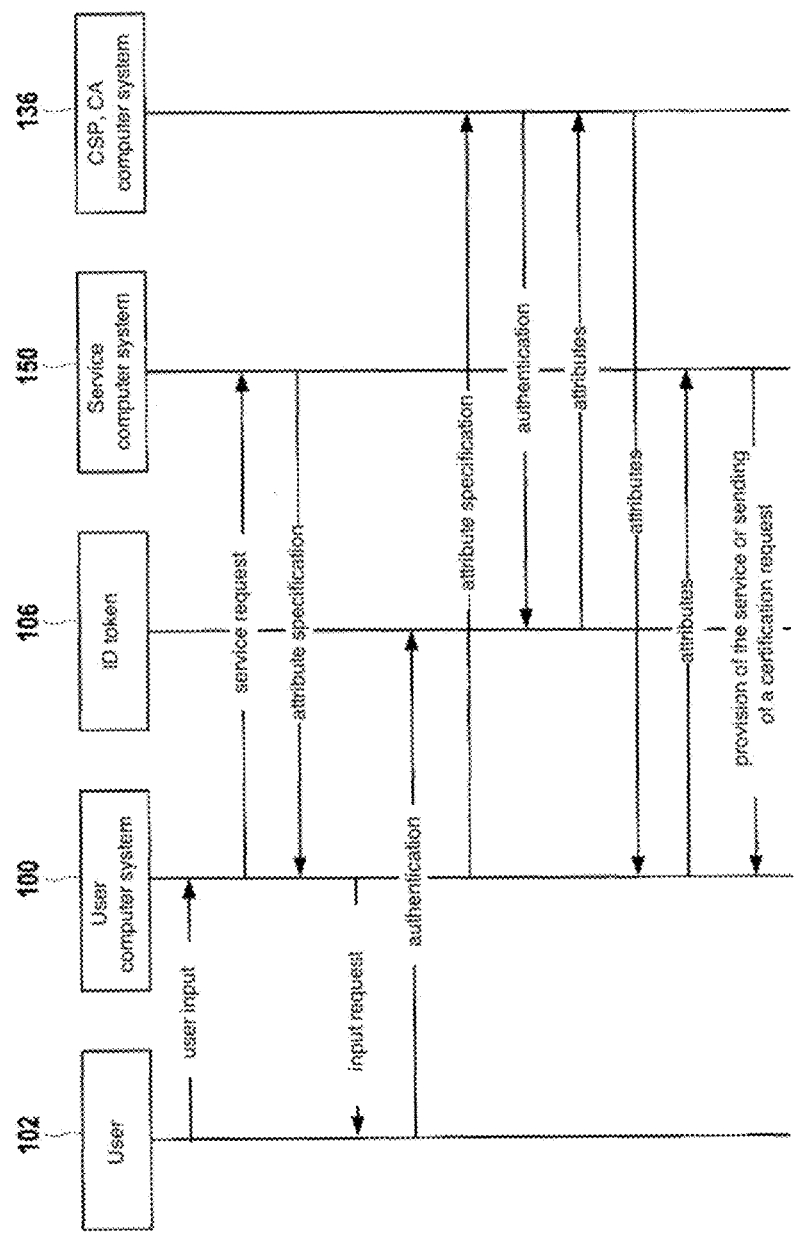
Figure 4:
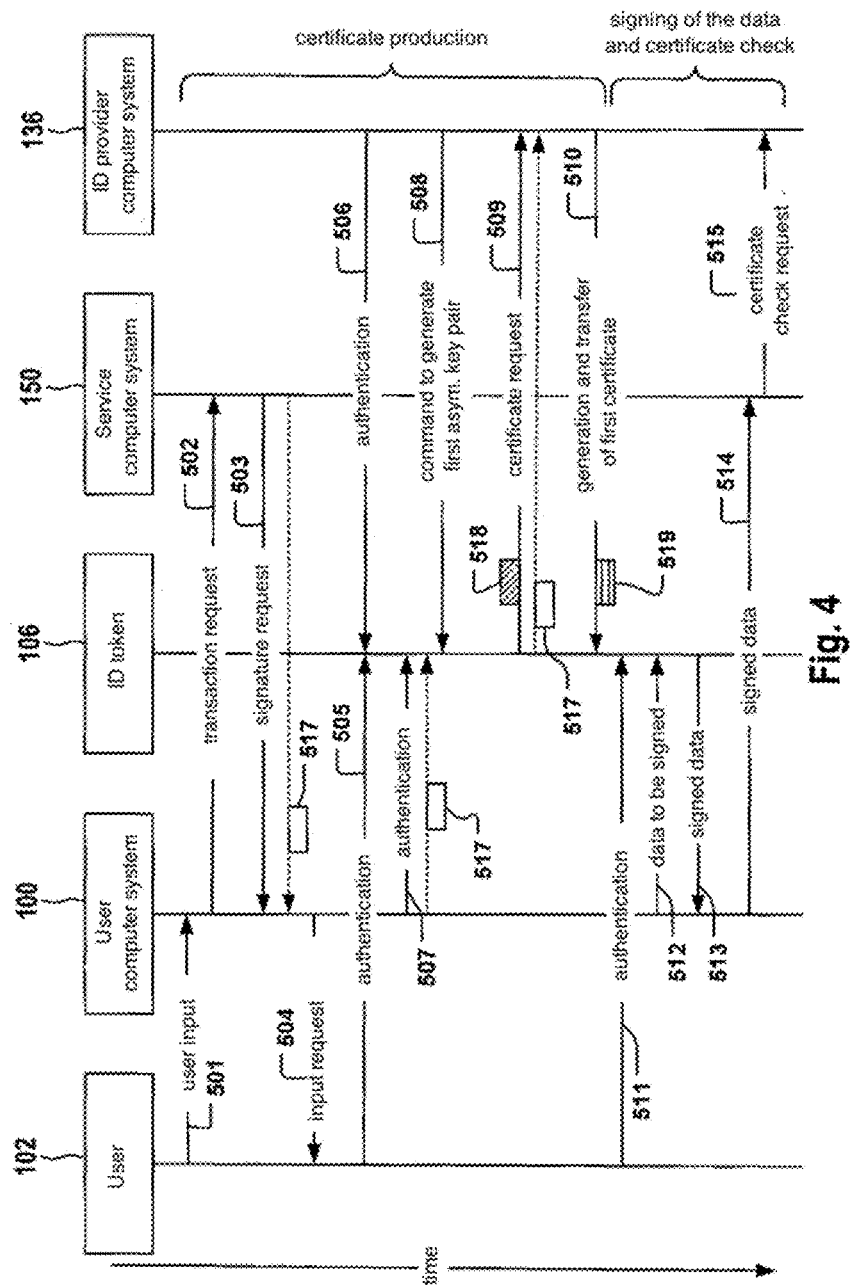
Figure 5A:
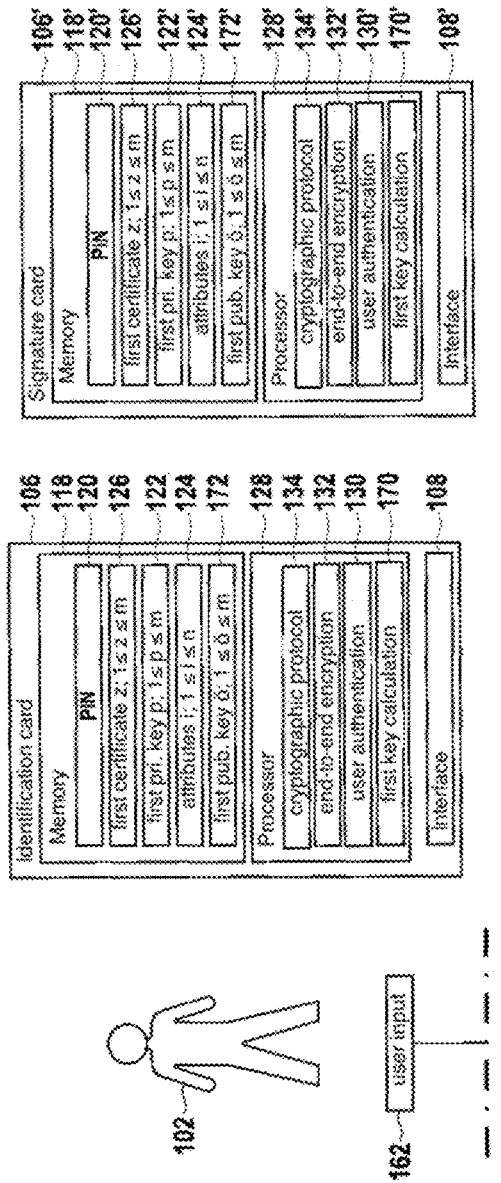
Figure 5B:
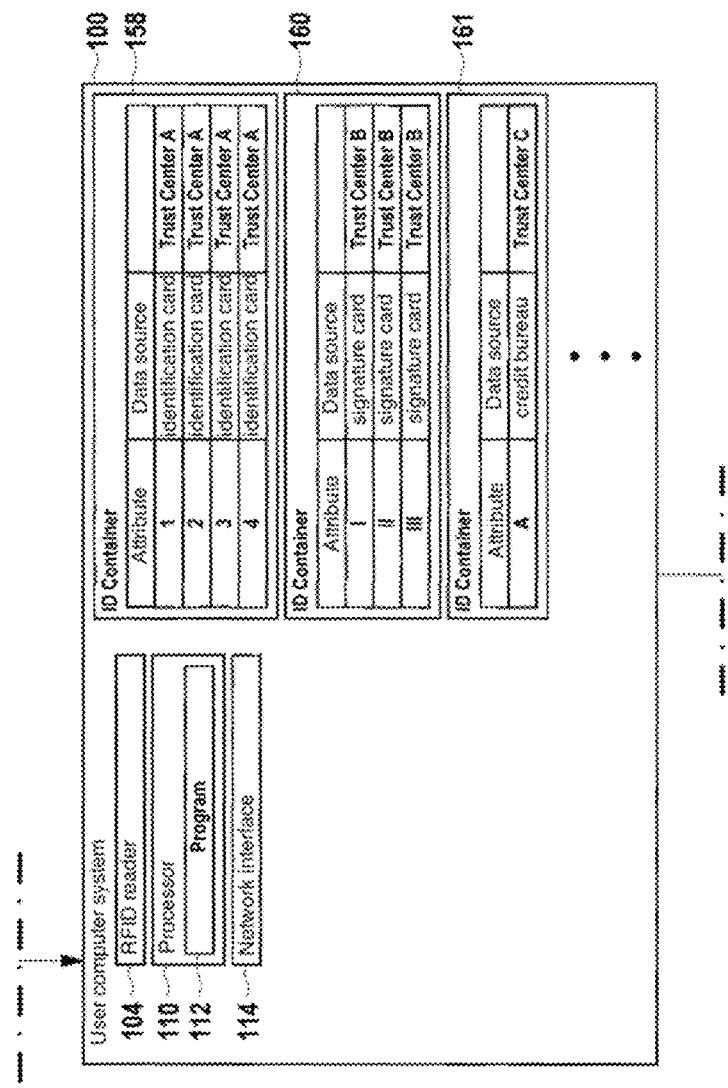
Figure 6:
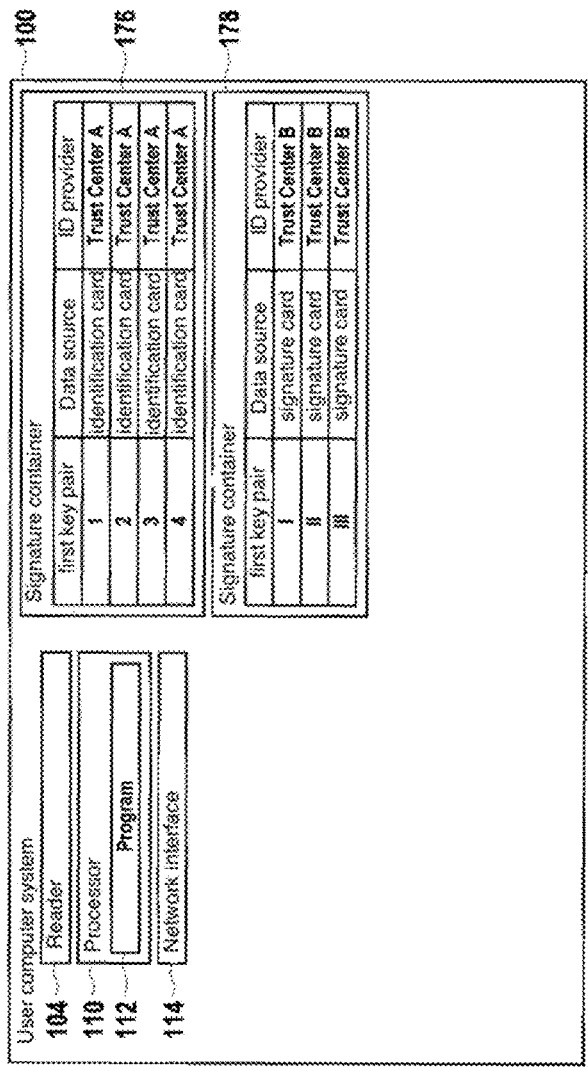

Embodiments of the invention are explained in more detail below with reference to the drawings, in which:

FIG. 1 shows a block diagram of a first embodiment of computer systems according to the invention, FIG. 2 shows a flowchart of an embodiment of a method according to the invention, FIG. 3 shows a UML diagram of a further embodiment of a method according to the invention, in accordance with which the ID token has an authentication function, FIG. 4 shows a UML diagram of a further embodiment of a method according to the invention and illustrates steps when generating a certificate, FIG. 5a shows various embodiments of an ID token according to the invention, FIG. 5b shows a block diagram illustrating a possible configuration of a user computer system for managing a plurality of ID tokens that can be used for user identification, FIG. 5c shows a block diagram of a plurality of computer systems, wherein a plurality of different ID provider computer systems are contained, FIG. 6 shows a block diagram, which illustrates a possible configuration of a user computer system for managing a plurality of ID tokens according to the invention for signing electronic documents, and FIG. 7 shows a UML diagram of a further embodiment of a method according to the invention and illustrates steps for generating the certificate, signature production and certificate checking.

Elements of the embodiments below which correspond to one another are identified by the same reference symbols.

FIG. 1 shows a user computer system 100 of a user 102. The user computer system 100 may be a personal computer, a portable computer, such as a laptop or palmtop computer, a personal digital assistant, a mobile telecommunication appliance, particularly a smart phone or the like. The user computer system 100 has an interface 104 for communication with an ID token 106 which has an appropriate interface 108. The computer system 100 corresponds in terms of function to a third computer system corresponding to previously described embodiments of the invention.

The user computer system 100 has at least one processor 110 for executing program instructions 112 and also a network interface 114 for communication via a network 116. The network may be a computer network, such as the Internet.

The ID token 106 has an electronic memory 118 with protected memory areas 120, 122 and 124. The protected memory area 120 is used for storing a reference value which is required for authenticating the user 102 to the ID token 106. Said reference value is an identifier, for example, particularly what is known as a "personal identification number" (PIN), or is reference data for a biometric feature of the user 102 which can be used for authenticating the user to the ID token 106. The memory area 120 may thus contain the reference value of the first PIN and, where applicable, also the reference value of the second PIN.

The protected area 122 is used for storing at least a first private key. The embodiment of the ID token according to the invention illustrated in FIG. 1 further includes a further protected memory area 124, which for example may contain secret attributes, for example personal data of the user 102 associated with the ID token, such as his name, place of residence, date of birth, sex, and/or attributes which relate to the ID token itself, such as the institution which produced or issued the ID token, the validity period of the ID token, or an identifier for the ID token, such as a passport number or a credit card number.

The electronic memory 118 may also have a memory area 126 for storing a first certificate. The first certificate may contain a first public key or be associated with this first public key, wherein this first public key is associated with the first private key stored in the protected memory area 122 and, together therewith, forms the first asymmetric key pair generated by the ID token. The first certificate may have been produced on the basis of a public key infrastructure (PKI) standard, for example on the basis of the X.509 standard. The first private key contained in the protected memory 122 may be used to sign electronic documents.

The first certificate does not necessarily have to be stored in the electronic memory 118 of the ID token 106. Alternatively or in addition, the certificate may also be stored in a public directory server, particularly in a storage medium of the first computer system that was involved in the issuing of the first certificate.

The ID token 106 has a processor 128. The processor 128 is used for executing program instructions 130, 132, 134 and 170. The program instructions 130 are used for user authentication, that is to say for authenticating the user 102 to the ID token.

In an embodiment using PINs, the user 102 inputs his PIN, in order to authenticate himself, into the ID token 106, for example via the user computer system 100. Execution of the program instructions 130 then accesses the protected memory area 120 in order to compare the input PIN with the reference value stored therein for the PIN. If the input PIN matches the reference value for the PIN, the user 102 is deemed to have been authenticated.

Alternatively, a biometric feature of the user 102 is captured. By way of example, the ID token 106 has a fingerprint sensor for this purpose, or a fingerprint sensor is connected to the user computer system 100. The biometric data captured from the user 102 are compared with the biometric reference data stored in the protected memory area 120 by executing the program instructions 130 in this embodiment. If there is a sufficient match between the biometric data captured from the user 102 and the biometric reference data then the user 102 is deemed to have been authenticated.

The program instructions 134 are used for executing the steps of a cryptographic protocol which relate to the ID token 106 in order to authenticate a first computer system, for example an ID provider computer system 136, to the ID token 106. The cryptographic protocol may be a challenge/response protocol based on a symmetric key or an asymmetric key pair.

By way of example, the cryptographic protocol implements an extended access control method, as is specified for machine-readable travel documents (MRTDs) by the international aviation authority (ICAO). Successful execution of the cryptographic protocol authenticates the ID provider computer system 136 to the ID token, thus proving its authorization for initiating the generation of the first asymmetric key pair, for reading the generated first public key and possibly for writing the certificate belonging to the first public key to the memory area 126. The authentication may also be reciprocal, that is to say the ID token 106 then also needs to authenticate itself to the first computer system, for example the ID provider computer system 136, on the basis of the same or a different cryptographic protocol.

The program instructions 132 are used for the end-to-end encryption of data transmitted between the ID token 106 and the ID provider computer system 136, at least however to transmit the command to produce a first asymmetric key pair from the ID provider computer system 136 to the ID token and to transmit the generated first public key from the ID token to the ID provider computer system 136. The secure communication channel formed by the end-to-end encryption may further be used to transmit the attributes read by the ID provider computer system 136 from the protected memory area 124, to transmit the command to produce a first asymmetric key pair from the ID provider computer system 136 to the ID token 106, and to write the first certificate belonging to the first public key into the memory area 126. For the end-to-end encryption, it is possible to use a symmetric key which is agreed between the ID token 106 and the ID provider computer system 136 when the cryptographic protocol is executed, for example.

The program instructions 170 specify a suitable method for calculating the first asymmetric key pair. The execution of the program instructions 170 can be initiated by the ID provider computer system 136. Following successful execution of the program instructions 170, the first private key is written in the protected memory area 122, whilst the affiliated first public key is stored in the memory area 172 and is transmitted to the ID provider computer system as a copy. The first certificate belonging to this first public key and generated by the ID provider computer system can be stored in the memory area 126 in accordance with the embodiment illustrated in FIG. 1.

As an alternative to the embodiment shown in FIG. 1, the user computer system 100 can use its interface 104 to communicate with the interface 108 not directly but rather via a reader, connected to the interface 104, for the ID token 106. This reader, for example what is known as a "class 2 chip card terminal", can also be used to input the PIN.

The ID provider computer system 136 has a network interface 138 for communication via the network 116. The ID provider computer system 136 also has a memory 140 which stores a second private key 142 for the ID provider computer system 136 and also the appropriate second certificate 144, which for example may be used during the authentication of the ID provider computer system to the ID token. This second certificate may also be a certificate based on a PKI standard, for example, such as X.509.

The ID provider computer system 136 also has at least one processor 145 for executing program instructions 146 and 148. By executing the program instructions 146, the steps of the cryptographic protocol 134 which relate to the ID provider computer system 136 are executed to authenticate the ID provider computer system to the ID token. Overall, the cryptographic protocol is thus implemented through execution of the program instructions 134 by the processor 128 of the ID token 106 and also through execution of the program instructions 146 by the processor 145 of the ID provider computer system 136 to authenticate the ID provider computer system to the ID token.

The program instructions 148 are used to implement the end-to-end encryption on the ID provider computer system 136, for example on the basis of the symmetric key which has been agreed between the ID token 106 and the ID provider computer system 136 when the cryptographic protocol is executed. In principle, it is possible to use any method for agreeing the symmetric key for the end-to-end encryption which is known per se beforehand, such as a Diffie-Hellman key exchange.

The ID provider computer system 136 is preferably situated in a particularly protected environment, particularly in what is known as a "trust center", so that the ID provider computer system 136 forms the confidence anchor for the generation of the first asymmetric key pair by the program instructions 170 of the ID token 106 in combination with the need for authentication of the user 102 to the ID token 106.

A second computer system, for example the service computer system 150 shown in FIG. 1, may be designed to receive a transaction request, for example an order or a commission for a service or a product, particularly an online service. By way of example, the user 102 can open an account at a bank or use another financial or banking service online via the network 116. The service computer system 150 may also be in the form of an online warehouse, so that the user 102 can purchase a mobile telephone or the like online, for example. In addition, the service computer system 150 may also be designed to deliver digital content, for example for the download of music data and/or video data.

To this end, the service computer system 150 has a network interface 152 for connection to the network 116. In addition, the service computer system 150 has at least one processor 154 for executing program instructions 156. Execution of the program instructions 156 generates dynamic HTML pages, for example, which the user 102 can use to input his commission or his order.

Depending on the nature of the product or the service commissioned or ordered during the course of the transaction request, the service computer system 150 sends a signature request to the user computer system 100, that is to say a request to sign data, of which the signing is necessary to carry out the requested transaction. The data to be signed may be formed for example as an electronic document. This signature request contains the data to be signed or details concerning how the data to be signed can be obtained. According to some embodiments of the invention, the signature request also contains a first data value, which is associated with the data to be signed and/or is derived therefrom, and which is suitable for restricting the validity of the requested electronic signature. Once this signature request has been received by the user computer system 100, the user 102 and the ID provider computer system 136 authenticate themselves to the ID token. Following successful authentication of both the user and the ID provider computer system, a first asymmetric key pair, unless already present on the ID token, is generated by the program instructions 170 for calculating the first asymmetric key pair of the ID token in response to a command of the ID provider computer system. The validity of the first certificate belonging to the generated first public key is thus restricted in accordance with the details contained in the first data value.

Following authentication at least of the user 102 and of the user computer system 100 to the ID token 106, the user 102 of the user computer system 100 can sign the data to be signed, for example the received electronic document or hash value thereof, using the generated first private key and can send the data back to the service computer system 150 together with the first public key. The service computer system 150 can then check the authenticity and validity of the signature of the signed electronic document, for example by sending a certificate check request to the ID provider computer system 136, wherein the certificate check request contains the public key belonging to the signature. The ID provider computer system 136 can then send back the first certificate associated with this first public key to the requesting service computer system 150. Since details concerning the identity of the user and the validity of the certificate are contained in the certificate sent back, the service computer system 150 can check whether the signature is valid at the present moment in time and for the current transaction. Only if this check is passed is the order or the commission from the user 102 taken and/or performed.

By way of example, conclusion of a legally binding credit agreement requires the user 102 to provide an electronic document, which contains the credit agreement, with a qualified electronic signature. In the prior art, the user 102 must thus use a key pair issued for and associated with the user over a lifetime or very long period for example to sign electronic documents and must take corresponding measures to safeguard against misuse of this key pair. Since, according to embodiments of the present invention, the validity of the first asymmetric key pair used for signing or of the first certificate associated with said key pair is restricted, the risk of misuse is considerably reduced.

The embodiment of the invention illustrated in FIG. 1 further has the advantage that the user can also use the ID token to prove his identity to the service computer system 150 or also just to prove that particular properties apply to his person, for example the fact that the user 102 has a particular minimum age. By way of example, the minimum age may be one of the attributes stored in the memory area 124. By way of example, the user 102 can use one of the attributes to provide evidence that he belongs to a particular group of people which is authorized to access data held on the service computer system 150 for download. By way of example, such an attribute may be a minimum age of the user 102 or the affiliation of the user 102 to a group of people which has access authorization for particular confidential data.

To generate a first certificate and affiliated first asymmetric key pair for signing an electronic document, which is provided by the service computer system 150 in response to a transaction request for a user to carry out a transaction, the procedure is as follows:

1. Authentication of the user 102 to the ID token 106.

The user 102 may authenticate himself to the ID token 106 as follows for example: In an implementation using PINs, the user 102 does this by inputting his PIN, for example using the user computer system 100 or a chip card terminal connected thereto. By executing the program instructions 130, the ID token 106 then checks the correctness of the input PIN. If the input PIN matches the PIN's reference value stored in the protected memory area 120, the user 102 is deemed to have been authenticated. The procedure may be similar if a biometric feature of the user 102 is used to authenticate him, as described above.

2. Authentication of the ID provider computer system 136 to the ID token 106.

To this end, a connection is set up between the ID token 106 and the ID provider computer system 136 via the user computer system 100 and the network 116. By way of example, the ID provider computer system 136 transmits its second certificate 144 via this connection to the ID token 106. The program instructions 134 then generate what is known as a "challenge", that is to say a random number, for example. This random number is encrypted using the public key of the ID provider computer system 136, which is contained in the second certificate 144. The resulting cipher is sent from the ID token 106 via the connection to the ID provider computer system 136. The ID provider computer system 136 decrypts the cipher using its second private key 142 and in this way obtains the random number. The random number is returned by the ID provider computer system 136 to the ID token 106 via the connection. By executing the program instructions 134, said ID token checks whether the random number received from the ID provider computer system 136 matches the originally generated random number, that is to say the challenge. If this is the case, the ID provider computer system 136 is deemed to have been authenticated to the ID token 106. The random number can be used as a second symmetric key for the end-to-end encryption.

3. When the user 102 has successfully authenticated himself to the ID token 106, and when the ID provider computer system 136 has successfully authenticated itself to the ID token 106, the ID provider computer system 136 is provided with authorization for generating a first asymmetric key pair, for storing at least the first private key on the protected memory area 122, for storing the affiliated public key on the memory area 172, and for reading the generated first public key. According to the embodiment illustrated in FIG. 1, the ID provider computer system 136 is further provided with the right to write the first certificate belonging to the first public key and generated by the ID provider computer system in the memory area 126 of the ID token. Depending on the embodiment, the ID provider computer system 136 is also authorized, following successful authentication of the user 102 and the ID provider computer system 136 to the ID token 106, to read one or more or all attributes stored in the protected memory area 124. On the basis of a relevant command to generate the first asymmetric key pair, which the ID provider computer system 136 sends to the ID token 106 via the secure connection, the first asymmetric key pair is generated by the program instructions 170 by the processor 110 of the ID token. The steps of reading attributes from the memory area 124, of receiving the first public key and of writing the affiliated first certificate to the memory area 126 are prompted by corresponding commands from the ID provider computer system to the ID token. In this case, the data are exchanged within a secure data transmission connection. The ID provider computer system 136 is thus provided with knowledge of the public key produced by the ID token and can produce an affiliated first certificate. The secured data transmission connection may be formed for example on the basis of what is known as a "secure messaging method".

Furthermore, the ID provider computer system 136 may receive a first data value of a second computer system, for example the service computer system 150. This first data value may be received directly from the second computer system or indirectly via the ID token. The first data value is used by the ID provider computer system to determine the scope of validity or the period of validity of the certificate belonging to the received first public key.

Attributes read by the ID provider computer system can be signed by the ID provider computer system with the aid of a second certificate 144 and transmitted via the user computer system 100 or directly to the service computer system 150. The service computer system 150 is thus provided with knowledge of the attributes read from the ID token 106, and therefore the service computer system 150 can check these attributes on the basis of the predefined one or more criteria so as to then provide the service requested by the user 102 where necessary.

The need to authenticate the user 102 to the ID token 106 and to authenticate the ID provider computer system 136 to the ID token 106 provides the necessary confidence anchor, so that the service computer system 150 can be certain that the attributes of the user 102 which have been communicated to it by the ID provider computer system 136 are correct and not falsified Depending on the embodiment, the order of the authentication may be different. By way of example, provision may be made for the user 102 to have to authenticate himself to the ID token 106 first of all, followed by the ID provider computer system 136. In principle, however, it is also possible for the ID provider computer system 136 to have to authenticate itself to the ID token 106 first of all, followed only then by the user 102.

In the first case, the ID token 106 is designed, by way of example, such that it is unlocked only through input of a correct PIN or a correct biometric feature by the user 102. Only this unlocking allows the program instructions 132, 134 and 170 to start and hence the ID provider computer system 136 to be authenticated, the establishment of an end-to-end encryption and also the generation of a first cryptographic key pair.

In the second case, it is also possible to start the program instructions 132 and 134 even when the user 102 has not authenticated himself to the ID token 106. In this case, by way of example, the program instructions 134 are in a form such that the ID provider computer system 136 cannot execute the program instructions 170 for generating a first asymmetric key pair and/or cannot perform read access to the protected memory area 124 until after the program instructions 130 have signaled that the user 102 has also been successfully authenticated.

If a suitable first asymmetric key pair with associated valid first certificate is already present on the storage medium of the ID token, the generation of this key pair by means of the ID provider computer system via the secure data transmission connection can also be omitted, and the present first private key can be used directly to sign electronic documents once the user and the user computer system 100 have been authenticated.

Of particular advantage is the utilization of the ID token 106 for e-commerce and e-government applications, for example, since the method according to the invention and the ID token and computer system according to the invention can prompt the generation, without media disruption, of first asymmetric key pairs, which can be used to sign electronic documents and which meet particularly high security requirements, such that a misuse of the first private key in particular is ruled out. On the one hand, the private key is stored on a protected memory area of the ID token so that it cannot be read without the input of a first or a first and at least one second PIN. On the other hand, embodiments of the present invention enable the generation of first asymmetric key pairs and affiliated first certificates, of which the validity is highly restricted. Furthermore, embodiments of the ID token according to the invention for e-commerce applications are particularly advantageous, since they not only provide a secure signature function, but also enable the user to authenticate himself as being authorized to various service providers. This last feature is enabled by the authentication of the user 102 and of the ID provider computer system 136 to the ID token 106, which produces a confidence anchor, on the basis of which further confidence-critical applications can be implemented, for example the signing of electronic documents. Of particular advantage is also the fact that central storage of the attributes of various users 102 is not necessary.

FIG. 2 shows an embodiment of a method 200 according to the invention for producing a first certificate. In step 201, a transaction request for the user to carry out a transaction is sent, for example from the user computer system 100 to the service computer system 150. By way of example, the user 102 does this by starting an Internet browser on the user computer system 100 and inputting a URL to call a web page on the service computer system 150. The user then inputs his transaction request into the called web page, for example a request to a financial institute to approve credit of a particular sum.

Step 202 includes the receipt of a signature request to sign data, wherein the signing of the data is necessary to carry out the requested transaction. The signature request is received in this case as a response to the step of sending 201 the transaction request. The user computer system 100 may receive a signature request, for example from a second computer system such as a computer system of the credit institute to which the transaction request in step 201 was directed. This signature request may contain one or more electronic documents for example, which are to be signed by the user. According to further embodiments of the invention, the signature request may further contain a first data value, which is suitable for restricting the validity of the certificate to be generated. According to further embodiments, the first data value may also be transmitted at a later moment in time to the user computer system.

According to embodiments of the invention, the user 102 is authenticated to the ID token 106 in step 203, and a first computer system, for example the ID provider computer system 136, is authenticated to the ID token 106 in step 204. In addition, the ID token may also be authenticated to the ID provider computer system. In step 205, it is checked whether both the user 102 and the first computer system 136 have been successfully authenticated to the ID token 106. Only if they have been authenticated, that is to say if the result of the checking step 205 is thus positive, can step 206 be executed.

Step 206 includes the fact that the first computer system prompts the processor 128 of the ID token 106, by means of a corresponding command, to execute the program instructions 170 to produce a first asymmetric key pair. According to further embodiments of the invention, step 206 may also include the fact that the ID provider computer system is provided by the ID token with the access authorization to read the attributes from the memory area 124, which are then transmitted to the ID provider computer system, for example by means of end-to-end encryption via a secure connection. The read attribute values can then be signed by the ID provider computer system by means of second signature keys and transmitted via the network 116 to a second computer system 150 for example, either directly or via the user computer system 100.

In the following step 207, the generated first private key and the generated first public key are stored on the ID token. The first private key is stored on the protected area 122. Furthermore, the generated first public key is transmitted to the first computer system, for example the ID provider computer system 136, in step 208. In step 209, the ID provider computer system generates a first certificate associated with the first public key. This first certificate is valid for the requested transaction and is only produced specifically to carry out the requested transaction. In step 210, the generated first certificate can then be stored by the first computer system and made publicly available. Depending on the embodiment of the invention, the generated first certificate may also be written to the memory area 126 of the ID token 106 in a further step 211.

FIG. 3 shows further advantageous method steps, which can be executed by ID tokens that additionally have one or more user-specific attributes stored in the protected memory area 124. These steps are not used directly for certificate production, but are particularly advantageous in practice because, in combination with steps according to the invention for generating a certificate, they can simplify enormously the electronic handling of transactions in the e-commerce field. By means of the process steps described hereinafter and illustrated in FIG. 3, the user of an ID token according to the invention can thus additionally authenticate himself to a service or at least prove that he is authorized to take advantage of a particular service, for example that he has a specific minimum age. By way of example, the user could first achieve access to a service via this authentication function so as to then enter into a legally binding agreement with the service provider in the next step as a result of the user sending the service provider a transaction request in accordance with the method according to the invention, receiving an electronic agreement document, filling this out, signing it with the aid of the ID token and the private key generated therein and thus entering into a legally binding agreement with the service provider.

The authentication function, which is particularly advantageous in combination with the signature function of the ID card, will thus be described specifically hereinafter.

As a result of an input by a user 102 into a user computer system 100, the user 102 specifies a service of a service computer system, which he would like to use. For example, this is achieved by calling an Internet page on the service computer system and selecting a service offered there. The service request from the user 102 is transmitted from the user computer system 100 to the service computer system 150.

The service computer system 150 responds to the service request with an attribute specification, that is to say for example a list of attributes names. For example, the service could request the attribute "age". The attribute specification contains a specification of the attribute of the ID taken 106 of which the service computer system 150 needs to have knowledge so as to provide the service desired by the user at 102. This attribute specification is a request from the service computer system 150 to the ID provider computer system 136 to read these attributes securely. After receiving the attribute specification, the user computer system 100 requests that the user 102 authenticate himself to the ID token 106, for example by means of an input request.

The user 102 then authenticates himself to the ID token 106, for example by inputting his first PIN. Following successful authentication, the attribute specification is forwarded from the user computer system 100 to an ID provider computer system 136. This then authenticates itself to the ID token 106 and directs to the ID token 106 a read request to read the attributes according to the attribute specification. For example, the ID provider computer system then reads the attributes for age specification of the user from the protected memory area 124.

With the precondition of the prior successful authentication of the user 102 and of the ID provider computer system 136, the ID token 106 responds to the read request with the desired attributes. The ID provider computer system 136 signs the attributes using a second signature key, which is inherent to the ID provider computer system and which belongs to a second asymmetric key pair, and sends the signed attributes to the user computer system 100. Once released by the user 102, the signed attributes are then transmitted to the service computer system 150, which may then provide the desired service where necessary.

FIG. 4 shows a flow diagram of one embodiment of the method according to the invention for generating a certificate by means of the ID token 106 in the form of a UML diagram. As a result of an input by a user 102 in a user computer system 100, the user 102 specifies a service of a service computer system, which he would like to use. For example, this is achieved by calling an Internet page on the service computer system and selecting one of the services offered there. A corresponding transaction request 502 from the user 102 is transmitted from the user computer system 100 to the service computer system 150. This transaction request may be a filled-in HTML form for example, in which the user is requesting from a service, for example a bank, to borrow credit for example and for the service to send the respective agreement papers/documents.

The service computer system 150 responds to the transaction request 502 with a signature request 503, that is to say for example the sending of an electronic document to the user together with the request to fill this in and provide it with a signature affiliated to the user, in particular a qualified electronic signature, and to send it back to the service. After receiving the signature request 503, the user computer system 100 requests that the user 102 authenticate himself 505 to the ID token 106, for example by means of an input request 504.

The dotted arrow directly below the signature request 503, which points from the service computer system 150 toward the user computer system 100, indicates that, according to some embodiments of the invention, the signature request 503 may contain a first data value 517, which is suitable for restricting the validity of the first asymmetric signature key pair and the affiliated first certificate to be provided. According to further embodiments, a plurality of data values 517, which are suitable for restricting the validity of the first asymmetric signature key pair and the affiliated first certificate to be produced, may also be transmitted. In the embodiments explained hereinafter, the method is described for a first data value 517. For example, this first data value 517 may be a hash value of the transmitted electronic document, a document number, transaction number, invoice number, order number, an identifier of the operator of the second computer system, an identifier of the second computer system in itself, or the like. The first data value may also be a value derived from these numbers or the content of the document, for example a hash value.

The temporal progression of the method illustrated in FIG. 4 runs from top to bottom in accordance with the time arrow illustrated to the left-hand side of the figure. The sequence of the individual steps may differ slightly in terms of some details depending on the embodiment.

According to some embodiments of the invention, it is necessary for both the user 102 and the ID provider computer system 136 to authenticate themselves to the ID token 106 before the ID provider computer system can send a command to generate a first asymmetric key pair to the ID token 106. The authentication of the ID provider computer system is illustrated by the arrow 506. According to further embodiments, the user computer system 100 also authenticates itself to the ID token in step 507. Whether the user authenticates itself first to the ID token, followed by the ID provider computer system or vice versa is dependent on the respective embodiment of the invention. The user 102 authenticates himself to the ID token 106 in step 505, for example by inputting a first PIN. This authentication takes place via the user computer system 100 according to the embodiment illustrated in this instance.

According to further embodiments, the first data value 517, which is received by the user computer system 100 when receiving the signature request from the service computer system 150, is buffered on the user computer system 100 for example. The first data value 517 may be forwarded to the ID token, for example during the course of authentication 505 of the user 102 to the ID token 106 via the use of computer system 100. The first data value may also be transmitted to the ID token for example during the course of authentication 507 of the third computer system to the ID token 507 or at another moment in time. The forwarding of the first data value 517, which is transmitted from the user computer system to the ID token to restrict the validity of the certificate to be issued, is also illustrated in this instance in the form of a dotted arrow directly beneath the authentication arrow 507.

In the step represented by the arrow 508, a command to generate a first asymmetric key pair is transmitted. According to preferred embodiments of the invention, this command is transmitted via a secured communication connection from the ID provider computer system to the ID token.

The processor of the ID token executes the program instructions to generate the first asymmetric key pair and stores the first private key in the protected memory area 122 and the affiliated first public key 518 in the memory area 172. The first public key 518 may then be read by the ID provider computer system 136 from the memory area 172 of the ID token 106 and can be used to generate an affiliated first certificate 519: According to embodiments of the invention, the first public key 518 is transmitted from the ID token to the ID provider computer system during the course of a certificate request 509 from the ID token to the ID provider computer system. In addition to the public key 518, the first data value 517 can also be read from the ID token by the ID provider computer system and transmitted to the ID provider computer system, where the first data value 517 is used by the ID provider computer system to determine the period of validity of the generated certificate 519.

According to the embodiment illustrated in FIG. 4, the generated first certificate 519 is then published, transmitted back to the ID token 106 in step 510 and stored in the memory area 126.

The first private key, which is stored in the memory area 122 and which is associated with the transmitted first certificate 519, can then be used to sign data, for example an electronic document. The private key is only (legally) binding as long as, or under the precondition that, it is specified in the respective first certificate 519 according to the first data value 517.

According to further embodiments of the invention, a further authentication step 511 takes place before the generation of the signature by the ID token, in which the user authenticates himself to the ID token, for example by means of a signature PIN. Following successful generation of the first asymmetric key pair, the data contained in the signature request 503 or elsewhere, for example an electronic document, can be transmitted from the user computer system 100 to the ID token 106 in step 512. The data to be signed, for example the transmitted electronic document, are encrypted by means of the first private key and thereby signed. The signed data are transmitted back in step 513 from the ID token 106 to the user computer system 100.

According to further embodiments of the invention, a derived value is formed from the data to be signed, for example from an electronic document to be signed. For example, a derived value may be a hash value of the electronic document. According to these embodiments, only this derived value is forwarded for signing in step 512 from the third computer system to the ID token, and therefore the volume of data to be transmitted in steps 512 and 513 is reduced.

The user then has the opportunity to transmit the signed data in step 514 from the user computer system 100 to the service computer system 150, for example by sending an e-mail to the service computer system and including the signed data as an attachment. In addition to the signed data, the first public key 519, which, together with the first private key used for signing, forms the first asymmetric key pair, is also transmitted to the service computer system 150.

Once the signed data and the affiliated first public key 519 have been received, the service computer system can send a certificate check request 515 to the ID provider computer system 136. According to embodiments of the invention, the certificate check request contains the public key 519. Once the certificate check request has been received, the ID provider computer system 136 determines the affiliated first certificate 519 and transmits this, or the data contained in this first certificate, back to the service computer system 150. The service computer system is thus able to check the authenticity and validity of the signature of the signed data.

FIG. 5a shows further embodiments of an ID token according to the invention, which are in the form of a document, such as a paper-based and/or plastic-based document comprising an integrated electronic circuit, which forms the interface 108, the memory 118 and the processor 128. By way of example, the integrated electronic circuit may be what is known as a "radio tag", which is also called an RFID tag or RFID label. The interface 108 may also be equipped with contacts or may be in the form of what is known as a "dual mode interface" however.

In particular, the document 106 may be a value document or security document, such as a machine-readable travel document (MRTD), such as an electronic passport or an electronic identification card with a signing function, or may be payment means, such as a credit card with an additional signing function, or a card for signing electronic documents.

In the embodiments under consideration in the present case, the protected memory area 122 may store one to several first private keys p, wherein $1 \leq p \leq m$. Accordingly, one to several public keys ö, each associated with the first private keys, is/are stored in the memory area 172, wherein $1 \leq ö \leq m$. In the embodiments illustrated in FIG. 5a, the first certificates belonging to the respective asymmetric key pairs are also stored on the ID token. Accordingly, one to several certificates z are stored on the memory area 126, wherein $1 \leq z \leq m$. The generation and storage of several first asymmetric key pairs and affiliated first certificates may be advantageous, in particular if the first key pairs and first certificates have been produced for one specific or a few particular transactions or documents to be signed and are only valid for this purpose or only for these transactions. One of the first asymmetric key pairs could thus have been produced and may be valid for signing a credit agreement, a next first asymmetric key pair may have been produced and valid for signing a hire-purchase agreement for a kitchen appliance with a particular online mail-order company, and further first asymmetric key pair could have been produced and valid for the signing of a tax return.

In the embodiments under consideration in the present case, the attributes i are also stored in the protected memory area 124, wherein $1 \leq i \leq n$.

An ID token 106 shown by way of example in FIG. 5a is an electronic identification card having an additional signing function, and a further ID token illustrated to the right-hand side of FIG. 5a is a signature card 106', commercially available specifically for the signing of electronic documents, to which the user must authenticate himself before using the signing function. The user 102 may thus have one or more further ID tokens, which are structured identically in principle, such as an ID token 106, which acts as an identification card having an additional signature function, and an ID token 106', which is a card purchased commercially primarily for signature purposes.

For example, the attribute i=1 is the surname, the attribute i=2 is the first name, the attribute i=3 is the address, and the attribute i=4 is the date of birth of a user associated with the ID token.

FIG. 5b shows a block diagram of a user computer system comprising a plurality of configuration data records 160, 160'. Each of the data records is an ID token according to the invention, which also has an authentication function as well as the signature function. Various services may require different user data for example. Some services may require details of age for example, whereas other services require the full address data of the user and/or the details of further attributes. The user may use a plurality of different ID tokens, on which different personal attributes are stored in redundant or non-redundant form. According to further embodiments of the invention, so as to enable the management of the personal attributes, which are stored on a plurality of different ID tokens and may each be read by different ID provider computer systems, the user computer system 100 has a program for managing and configuring a large number of ID tokens according to the invention, in particular the attributes and signature keys stored therein.

The user computer system 100 may store a plurality of configuration data records 158, 160, . . . . Each of the configuration data records indicates for a particular set of attributes a data source and an ID provider computer system which can read the specified data source. In this embodiment, the user computer system 100 can use the network 116 to address different ID provider computer systems 136, 136', . . . which may respectively be associated with different "trust centers". By way of example, the ID provider computer system 136 is associated with the trust center A, and the ID provider computer system 136', which is of the same design in principle, may be associated with another trust center B.

The configuration data record 158, which is also called an ID container, has the set of attributes for the attributes i=1 to i=4 defined in it. These attributes respectively have the data source "identification card", that is to say the ID token 106, and the trust center A, that is to say the ID provider computer system 136, associated with them. The latter may be specified in the form of its URL, for example, in the configuration data record 158.

By contrast, the configuration data record 160 has a set of attributes I, II and III defined in it. The data source indicated for these attributes is the respective signature card, that is to say the ID token 106'. The ID token 106' has a protected memory area 124' which stores the attributes I, II, III, . . . . The attribute I may be the name of the holder of the signature card, for example, the attribute II may be the signature card number and the attribute III may be the period of validity of the signature card, etc.

The ID provider computer system indicated in the configuration data record 160 is the ID provider computer system 136' of the trust center B.

As an alternative to the embodiment shown in FIG. 5b, it is also possible for different data sources and/or different ID provider computer systems to be indicated in the same configuration data record for different attributes.

In the embodiment in FIG. 5c, each of the ID provider computer systems 136, 136', . . . may have a respective plurality of second certificates.

By way of example, the memory 140 of the ID provider computer system 136, which is shown by way of example in FIG. 5a, stores a plurality of second certificates, such as the second certificates 144.1 and 144.2 with the respective associated second private keys 142.1 and 142.2. In the second certificate 144.1, read rights for the ID provider computer system 136 are defined for the attributes i=1 to i=4, whereas, in the second certificate 144.2, read rights are defined for the attributes I to III.

To use a service provided by the service computer system 150, the user 102 first of all makes a user input 162 into the user computer system 100, for example in order to input his request for the desired service into a web page on the service computer system 150. In further embodiments, the interface 104 of the user computer system 100 may be formed as an RFID reader, which may form an integral component of the user computer system or may be connected thereto as a separate component.

Said service request 164 is transmitted from the user computer system 100 via the network 116 to the service computer system 150. The service computer system 150 then responds with an attribute specification 166, that is to say by specifying those attributes which the service computer system 150 requires in order to handle the service request 164 from the user 102. By way of example, the attribute specification can be made in the form of the attribute name, such as "surname", "first name", "address", "credit card number".

The receipt of the attribute specification 166 is signaled to the user 102 by the user computer system 100. The user 102 can then select one or, if necessary, a plurality of the configuration data records 158, 160, . . . which respectively define sets of attributes which contain the attributes according to the attribute specification 166, at least as a subset.

If the attribute specification 166 merely requires notification of the surname, the first name and the address of the user 102, for example, the user 102 can select the configuration data record 158. If, by contrast, the signature card number is additionally specified in the attribute specification 166, the user 102 can additionally select the configuration data record 160. This process can also be performed fully automatically by the user computer system 100, for example by executing the program instructions 112.

Subsequently, it is first of all assumed that only one of the configuration data records illustrated in FIG. 5b, such as the configuration data record 158, is selected on the basis of the attribute specification 166.

The user computer system 100 then sends a request 168 to the ID provider computer system(s) indicated in the chosen configuration data record, in the example under consideration to the ID provider computer system 136 of the trust center A. Said request 168 contains an indication of the attributes, according to the attribute specification 166, which need to be read by the ID provider computer system 136 from the data source indicated in the configuration data record 158.

The ID provider computer system 136 then selects one or more of its second certificates which have the read rights required for reading these attributes. If, by way of example, the attributes i=1 to 3 are to be read from the identification card, the ID provider computer system 136 thus selects its second certificate 144.1, which defines the read rights required therefor. This selection of the second certificate is performed by executing the program instructions 149.

Next, the execution of the cryptographic protocol is started. By way of example, the ID provider computer system 136 to this end sends a response to the user computer system 100. The user computer system 100 then asks the user 102 to authenticate himself to the specified data source, that is to say in this case to the identification card.

The user 102 then brings his identification card, that is to say the ID token 106, into the range of the RFID reader 104, and inputs his PIN, for example, in order to authenticate himself. The successful authentication of the user 102 to the ID token 106 unlocks the latter for implementation of the cryptographic protocol, that is to say for implementation of the program instructions 134. Subsequently, the ID provider computer system 136 authenticates itself to the ID token 106 using the selected second certificate 144.1, for example using a challenge/response method. This authentication may also be reciprocal. Following successful authentication of the ID provider computer system 136 to the ID token 106, the ID provider computer system sends a read request for reading the requisite attributes to the user computer system 100, and the latter forwards this via the RFID reader 104 to the ID token 106. The ID token 106 uses the second certificate 144.1 to check whether the ID provider computer system 136 has the requisite read rights. If this is the case, the desired attributes are read from the protected memory area 124 and are transmitted by means of end-to-end encryption to the ID provider computer system via the user computer system 100.

The ID provider computer system 136 then sends a response 179, which contains the attributes which have been read, via the network 116 to the service computer system 150. The response 179 is digitally signed with the second certificate 144.1.

Alternatively, the ID provider computer system 136 sends the response 179 to the user computer system 100. The user 102 is then provided with the opportunity to read the attributes contained in the response 179 and to decide whether or not he actually wishes to forward these attributes to the service computer system 150. Only when a release command from the user 102 has been input into the user computer system 100 is the response 179 then forwarded to the service computer system 150. In this embodiment, it is also possible for the user 102 to add further data to the response 179.

If a plurality of ID provider computer systems 136, 136', . . . are involved, the individual responses from the ID provider computer systems can be combined by the user computer system 100 in a single response which all of the attributes according to the attribute specification 166 contain, said response then being sent from the user computer system 100 to the service computer system 150.

According to one embodiment of the invention, the user 102 can disclose one or more of his attributes to the service computer system 150 on the occasion of the service request 164, for example by transmitting said attributes of the user to the service computer system via the network 116 as part of the service request 164.

In particular, the user 102 can input said attributes into the web page on the service computer system 150. The correctness of these attributes is then confirmed by the response 179, that is to say the service computer system 150 can compare the attributes received from the user 102 with the attributes read from the ID token 106 by the ID provider computer 136 and can check them for a match.

According to a further embodiment of the invention, it is also possible for at least one further attribute to be indicated in the attribute specification 166, said attribute not being stored on one of the ID tokens of the user 102 but rather being able to be requested from an external data source. By way of example, this may involve an attribute relating to the creditworthiness of the user 102. To this end, the user computer system 100 may contain a further configuration data record 161 which contains the indication of a data source and of an ID provider computer system for the attribute A—for example creditworthiness. The data source may be an online credit agency, such as a credit bureau, Dun & Bradstreet or the like. By way of example, the ID provider computer system indicated is a trust center C. In this case, the data source may be located in the trust center C.

In order to request the attribute A, the user computer system 100 thus sends an appropriate request to the trust center C, that is to say the ID provider computer system 136". The latter then delivers the attribute A, which the user computer system 100 forwards to the service computer system 150 together with the further attributes which have been read from the ID token(s) of the user 102.

Preferably, the attribute A is requested after the attributes relating to the digital identity of the user 102 have already been requested from one of the ID tokens of the user 102, and have been received as a signed response 179 by the user computer system 100, for example. The request for the attribute A from the ID provider computer system 136" by the user computer system 100 then contains the signed response 179, so that the ID provider computer system 136" has reliable information about the identity of the user 102.

FIG. 6 shows a block diagram of a user computer system comprising a plurality of configuration data records 176, 178. Each of the configuration data records 176, 178 is an ID token according to the invention, which also has an authentication function as well as the signature function. Various services may have sent different certification requests to the user computer system, for example for signing purposes, which results in the generation of a plurality of first asymmetric key pairs and affiliated first certificates for signing purposes. For example, a bank service provider could have prompted the production of a first asymmetric key pair specifically for a particular credit agreement document, whereas a provider of household appliances could have prompted the production of a first asymmetric key pair and affiliated first certificate for all ordering processes, which are to be assigned to the user as the customer. The large number of generated first asymmetric key pairs and affiliated first certificates may have been certified by the same ID provider computer system 136 or by a number of different ID provider computer systems 136. The first asymmetric key pairs, and possibly also the affiliated first certificates, may all have been stored on the same ID token or on a plurality of different ID tokens of the user. So as to ensure that the user 102 can use these for signature purposes and possibly also for identification purposes, even with use of a plurality of ID tokens according to the invention, a program for managing a plurality of configuration data records 176, 178 can be installed on the user computer system 100.

Each of the configuration data records 176, 178 indicates for a particular first asymmetric key pair and affiliated first certificate a data source and an ID provider computer system, which were involved in the generation of the respective first asymmetric key pair. Each configuration data set thus indicates the ID provider computer system via which an electronic document signed with a particular first private key can be verified.

According to further embodiments of the invention, the user of the user computer system 100 can use this management program and the configuration data contained therein to select from a multiplicity of data sources (identification card with signing function, signature card, credit card with signing function, USB stick with signing function, etc.) and from a multiplicity of first private signature keys stored thereon. Once a specific data source and a private signature key contained therein have been selected, the user can thus sign an electronic document and send it to a service computer system 150. Since an ID provider (CSP) is associated definitively with each private signature key with the aid of the configuration data records 176, 178, the user can also simultaneously send, for example, a URL or another identifier for the ID provider associated with the used private signature key to the service computer system, together with the signed electronic document. The service computer system thus receives not only a signed electronic document, but automatically also details concerning the ID provider with which the service computer system can check the validity of the signature of the received signed electronic document.

The configuration data record 176, which is also called a signature container, has a set of asymmetric first key pairs i=1 to i=4 defined in it. These key pairs respectively have the data source "identification card", that is to say the ID token 106, and the trust center A, that is to say the ID provider computer system 136, associated with them. The latter may be specified in the form of its URL, for example, in the configuration data record 158.

By contrast, the configuration data record 178 has a set of first asymmetric key pairs I, II and III defined in it. The data source indicated for these attributes is the respective signature card, that is to say the ID token 106'. The ID token 106' has a protected memory area 122' which stores the first private signature keys of the first asymmetric key pair I, II, III, . . . . The key pair I may be a first asymmetric key pair, for example, which has been produced for signing a credit agreement.

The ID provider computer system indicated in the configuration data record 178 is the ID provider computer system of the trust center B.

As an alternative to the embodiment shown in FIG. 6, it is also possible for different data sources and/or different ID provider computer systems to be indicated in the same configuration data record for different first asymmetric key pairs.

FIG. 7 shows a flow diagram according to an embodiment of the method according to the invention for generating a certificate in the form of a UML diagram. The data processing and communication steps explained in FIG. 4 between the user computer system 100 and the ID token 106 are combined in FIG. 7 and are represented by the user system 526. According to embodiments of the invention, the user system 526 represents the user computer system 100 and ID token 106 described in FIG. 4. The steps illustrated in FIG. 7 thus basically relate to data communication steps between the user, the service and the ID provider computer system. According to embodiments of the invention, the data processing steps that take place on the user side are based on the steps illustrated in FIG. 4. According to further embodiments, the specific implementation of the method steps of producing a digital certificate and the signing of data taking place on the user side may also deviate from the embodiments described in the context of FIG. 4.

A transaction request 502 is first sent from the user system 526 to the service computer system 150. For example, this may occur as a result of the user 102 filling in an HTML form provided by the service computer system 150 to order a book from an online bookseller.

Once the service computer system 150 has received the transaction request 502, it sends a signature request 503 to the user system 526. The signature request 503 may contain data, of which the signing is necessary to carry out the requested transaction. Depending on the type of transaction requested, the user system 526 may also provide the data to be signed in another manner.

Once the signature request 503 has been received by the user system 526, a check is first carried out to establish whether a first certificate is available, which is suitable to prove the validity of the signature to be provided in accordance with the signature request 503. The certificate must also be valid for the requested transaction, that is to say it must not have expired. According to embodiments of the invention, a suitable certificate may not be available for a number of reasons. If, for example, the user has forgotten his signature PIN or, for example for cost reasons, does not have his own suitable certificate, the check reveals that, no first asymmetric key pair with associated valid certificate is present. The same is true, for example, if available first certificates have expired.

According to embodiments of the first computer system 136 according to the invention, said computer system has means for checking whether an existing asymmetric key pair with associated valid certificate on the ID token is already present on the ID token of the user, wherein a new asymmetric key pair and a new certificate associated with this new asymmetric key pair can only be produced if there is no existing asymmetric key pair with associated valid certificate already stored in the ID token.

If the check reveals that a suitable first certificate is not present, a message is sent in step 520 from the user system 526 to the service computer system 150, wherein the message contains the information that a suitable first certificate is not present or that such a suitable first certificate must be issued.

In preparation of a signature step required to carry out the requested transaction, the user 102 associated with the user system 526 may set his signature PIN himself.

Once the message has been received, the service computer system 150 sends a first data value 517 to the user system 526 in step 521. The first data value may specify a period of time for which the certificate to be issued is to be valid. According to further embodiments of the invention, the first data value 517 is a value derived from the data to be signed, for example a hash value, or is a component of the data to be signed, for example the document number or an order number of an electronic document to be signed.

According to further embodiments of the invention, the first data value 517 is suitable for signaling to the user 102 that the costs of issuing the first certificate do not have to be borne by the user 102, but that the costs will be borne by the operator of the service computer system 150. By way of example, the user system 526 may have a software which is suitable for generating a corresponding message to the user 102 after receiving the first data value 517.

According to further embodiments of the invention, the first data value 517 is also suitable for indicating to the ID provider computer system 136 that the first certificate to be issued is a one-time certificate, of which the validity is restricted to the production of a signature for a single electronic document, for example having a particular document number, which matches the first data value 517. By contrast with previously known signature methods, according to preferred embodiments of the invention, existing certificates therefore are not used to provide a requested signature, but a certificate of which the validity is limited specifically to the requested transaction is issued.

According to embodiments of the invention, a first asymmetric key pair is formed by the user system 526 once the first data value 517 has been received.

The first data value 517 and the first public key of the first asymmetric key pair are transmitted from the user system 526 to the ID provider computer system 136 during the course of the certificate request 509. The ID provider computer system 136 produces a first certificate 519 for the first public key 518 once the certificate request 509 has been received. The validity of the produced certificate 519 is determined by the first data value 517. For example, the first data value 517 specifies a period of validity of the certificate, and this validity period is therefore also specified in the produced first certificate 519. If the first data value 517 is formed for example as a document number of the document to be signed, the first certificate 517 thus also contains the document number and only validates signatures which have been produced based on the electronic document specified by the document number.

The produced first certificate 519 can then be published on a certificate server and/or transmitted back to the user system 526 in step 510.

A further advantageous aspect of embodiments of the present invention lies in the fact that, according to these embodiments, the first data value 517 is suitable for signaling to the ID provider computer system 136 that the operator of the service computer system will bear the costs for the requested first certificate.

A further advantageous aspect of embodiments of the present invention lies in the fact that, according to said embodiments, the first data value 517 is suitable for signaling to the ID provider computer system 136 that the requested first certificate is only valid for the operator of the service computer system 150. The user 102 can thus be prevented from using a first certificate, which has been produced for this user 102 at the cost of a first service provider, to carry out business transactions with other service providers. The validity of the first certificate to the service provider bearing the costs of the issuing of the certificate can be restricted for example in that the first data value contains the name of the service provider, and that this name is part of the first certificate, either in the form of plain text and/or in machine-readable form.

Once the first certificate has been produced, the user 102 can input the signature PIN set beforehand by the user so as to authenticate himself to carry out the signing process. The user system 526 then signs the data, of which the signing is necessary to carry out the requested transaction, with the first private key in step 523. The signature produced is valid, since a first certificate exists for the public key associated with the first private key and validates the signature to be issued during the course of the transaction.

The signed data, for example a signed electronic document, can then be transmitted in step 514 from the user system 526 to the service computer system 150. In step 514, the first certificate may also be transmitted to the service computer system where necessary. By decrypting the signature with the first public key, the service computer system can check the authenticity of the signed electronic document. The association of the public key to the user 102 of the user system 526 can be checked by a certificate check 516, which is carried out by the service computer system and the ID provider computer system 136. In step 516, it is also possible to check whether the first certificate 519 and therefore also the signature of the signed electronic document are valid for the requested transaction, that is to say whether, for example, the first data value of the first certificate matches, for example, the document number of the signed document.

If the authenticity of the signature and the validity of the first certificate are confirmed by the certificate check 516, the service can be provided in step 524.

According to preferred embodiments, the second computer system checks the signature of the signed data by requesting from the first computer system the certificate affiliated to the public key, if the affiliated certificate was not transmitted together with the signed data from the third computer system to the second computer system. According to further preferred embodiments, the second computer system checks whether the affiliated certificate contains the first data value, which was specified by the second computer system to limit the validity of the certificate.

According to embodiments of the invention, the user 102 can reset the signature PIN and/or delete the first certificate. A risk of misuse of the first private key produced is thus ruled out repeatedly, since, according to preferred embodiments of the invention, the affiliated first certificate is no longer valid once the requested transaction has been carried out, and since the user 102 also has the opportunity to set a new signature PIN (second PIN) and/or to delete from the ID token first certificates and/or asymmetric key pairs that are no longer required.

According to further embodiments of the invention, the method can also be used to control domestic electronic systems, in particular safety-critical domestic electronic systems. In many relatively large company office complexes, there is the problem that access to areas to which the access is graded according to a person's position within the company or in relation to the company has to be granted to people needing to access these areas. By way of example, some employees within the IT department thus require access to safety-critical rooms, in which the servers are arranged, which must not be accessible by other user groups, for example office workers or visitors. It is also necessary to issue visitors with particularly restricted access rights according to the length and purpose of the visit.

According to embodiments of the present invention, it is thus possible to use the mobile phone of a visitor as a user computer system, of which the electronic identification with signing function is used as an ID token, and a company server, which, in the form of a "service", manages the access to different areas within the company. For example, the visitor can send a transaction request to the company server via his mobile phone, wherein the transaction request contains the request to enter particular areas within the company. Further attributes of the user can also be read from his ID token during the course of this transaction request and transmitted to the company server, for example details concerning his surname and first name(s). In accordance with the read attributes, the company server can then request the issuing of certificates of limited validity, which allow the visitor to enter particular rooms. The company server could create a first data value specifically for the visitor and for each room to which the visitor is to have access and could request the issuing of corresponding certificates. According to embodiments of the method according to the invention, the access to each of these rooms by the user could require the user to execute a signature step by means of his mobile telecommunication appliance and the ID token when entering a company room. Since the key material and the certificates are each only produced for a particular user and particular rooms and are only valid for the requested transaction (access to a room) or only over a short period, there is no risk of the visitor gaining unauthorized access to areas or losing keys issued to him and thus possibly providing unauthorized access to third parties.

LIST OF REFERENCE SIGNS

100 User computer system
102 User
104 Interface
106 ID token
108 Interface
110 Processor
112 Program instructions
114 Network interface
116 Network
118 Electronic memory
120 Protected memory area
122 Protected memory area
124 Protected memory area
126 Memory area
128 Processor
130 Program instructions
132 Program instructions
134 Program instructions
136 ID provider computer system
138 Network interface
140 Memory
142 Private key
144 Certificate
145 Processor
146 Program instructions
148 Program instructions
149 Program instructions
150 Service computer system
152 Network interface
154 Processor
156 Program instructions
158 Configuration data record
160 Configuration data record
161 Configuration data record
162 User input
164 Service request
166 Attribute specification
168 Request
170 Program instructions
172 Memory area
174 Program instructions
176 Configuration data record
178 Configuration data record
179 Response
501 User input
502 Transaction request
503 Signature request
504 Input request
505 Authentication step
506 Authentication step
507 Authentication step
508 Command to generate first key pair
509 Certificate request
510 Transmission of first certificate
511 Authentication step
512 Transmission of the data to be signed
513 Transmission of the signed data
514 Transmission of the signed data to a service computer system
515 Certificate check request
516 Certificate check
517 First data value
518 First public key
519 First certificate
520 Message
521 Sending of the first data value
522 User sets signature PIN
523 User signs data
524 Service rendered
525 Deletion of signature PIN and first certificate
526 User system

What is claimed is:

1. A method for generating a transaction-bound certificate in a system comprising a first computer system associated with an ID provider, a second computer system associated with a service provider and a third computer system associated with a user, wherein the first, second and third computer systems are at distinct physical locations and are coupled to one another via a network, the method comprising:

sending, by the third computer system to the second computer system, a transaction request for the user to carry out a transaction;

sending, by the second computer system to the third computer system, responsive to receiving the transaction request:
 data to be signed and a signature request for signing the data to be signed,
 wherein signing of the data to be signed is necessary to carry out the requested transaction and
 wherein the signature request comprises at least one data value that is only produced specifically for the requested transaction by the second computer system once the transaction request has been received by the second computer system and
 wherein a first data value of the at least one data value comprises a document number of an electronic document, an order number of the electronic document, an identifier of an operator of the second computer system that sends the signature request, an identifier of the second computer system that sends the signature request, or a data value derived therefrom, a data value associated with or derived from the data to be signed, or a data value derived from content of the electronic document;

checking by the third computer system, responsive to receiving the signature request whether a transaction-bound certificate is available that is suitable for the requested transaction and, if this is not the case, executing the following:
 generating, by executing a program of instructions in a processor of an ID token, an asymmetric key pair consisting of a private key and a public key, wherein the ID token is associated with the user and wherein generation of the asymmetric key pair occurs exclusively external to the third computer system;
 storing the generated asymmetric key pair on the ID token, wherein at least the private key is stored in a protected memory area of the ID token;
 transmitting a certificate request from the ID token to the first computer system, the certificate request comprising the generated public key and at the least one data value of the signature request;

generating, by the first computer system, a transaction-bound certificate dependent upon the public key and the at least one data value; and sending, by the first computer system to the third computer system, the transaction-bound certificate responsive to generating, by the first computer system, the transaction-bound certificate;

wherein the validity of the transaction-bound certificate is restricted to the requested transaction and is dependent upon the least one data value and wherein the generation of the transaction-bound certificate occurs exclusively external to the third computer system, wherein checking, by the third computer system, whether an available transaction-bound certificate is suitable for the requested transaction comprises:

checking, at least from the first data value of the at least one data value, whether the available transaction-bound certificate is bound to the requested transaction; and checking whether an asymmetric key pair affiliated with the available transaction-bound certificate is stored in the ID token.

2. The method as claimed in claim 1, further comprising:
signing, by the ID token, the data to be signed with the private key; and
transmitting the signed data from the ID token to the third computer system.

3. The method as claimed in claim 2, further comprising:
transmitting the public key from the ID token to the third computer system, wherein the public key is transmitted as a component of the transaction-bound certificate;
transmitting the signed data and the public key from the third computer system to the second computer system, wherein the public key is transmitted as a component of the transaction-bound certificate; and
checking, by the second computer system, the signature of the signed data.

4. The method as claimed in claim 1, wherein the user is authenticated to the ID token by inputting a first PIN and a second PIN, wherein the first PIN is associated with the user and the second PIN can only be input once the first PIN has been input successfully, wherein the second PIN is a signature PIN specified by the user and wherein a successful input of the signature PIN unlocks a signature function of the ID token.

5. The method as claimed in claim 1, further comprising:
checking the presence of an already existing asymmetric key pair, together with an associated valid transaction-bound certificate, on the ID token by the first computer system,
wherein the asymmetric key pair and the transaction-bound certificate are only then produced if an existing asymmetric key pair with associated valid certificate is not already stored on the ID token.

6. The method as claimed in claim 1, wherein the first data value of the at least one data value comprises a value that is derived from a document number of an electronic document, an order number of the electronic document, an identifier of an operator of the second computer system, an identifier of the second computer system, or content of the electronic document.

7. The method as claimed in claim 1, wherein the first value of the at least one data value is associated with or derived from the data to be signed.

8. The method as claimed in claim 1, wherein the first data value of the at least one data value comprises:
a document number of an electronic document,
an order number of the electronic document;
an identifier of the operator of the second computer system, which sends the signature request; or
an identifier of the second computer system, which sends the signature request.

9. The method as claimed in claim 1, wherein the at least one data value specifies the period of time during which the transaction-bound certificate is valid.

10. The method as claimed in claim 1, wherein at least the public key is transmitted to the first computer system via a protected connection with end-to-end encryption between the ID token and the first computer system.

11. The method as claimed in claim 10, further comprising authenticating the user to the ID token; and
authenticating the first computer system to the ID token, wherein, once the user and the first computer system have been successfully authenticated, the protected connection between the ID token and the first computer system is set up.

12. The method as claimed in claim 1, wherein at least one attribute is stored in the ID token, further comprising:
read access of the first computer system to the at least one attribute stored in the ID token to transmit the at least one attribute to the second computer system.

13. A system comprising:
a first computer system associated with an ID provider, the first computer system comprising:
a network interface to a network; and
a computer processor for executing program instructions, where the program instructions comprise:
first program instructions that, when executed by the processor, authenticate the first computer system to an ID token via the network interface and the network;
second program instructions that, when executed by the computer processor, form a protected connection with end-to-end encryption between the ID token and the first computer system via the network interface and the network and receives a public key and at least one data value from the ID token, wherein the public key and a private key form an asymmetric key pair, and wherein the asymmetric key pair is associated with a user and wherein a first data value of the at least one data value comprises a document number of an electronic document, an order number of the electronic document, an identifier of the operator of a third computer system that sends a signature request, an identifier of the third computer system that sends the signature request, or a data value derived therefrom, a data value associated with or derived from the data to be signed, or a data value derived from content of the electronic document; and
third program instructions that, when executed by the computer processor, generate a transaction-bound certificate for the public key, wherein the certificate is suitable for a transaction requested by a second computer system associated with the user, wherein the validity of the transaction-bound certificate is determined by the received first data value and restricted to the requested transaction and wherein the transaction-bound certificate is associated with the user and wherein the generated transaction-bound certificate is sent by the first computer system to the second computer system,
wherein the first and second computer systems are at distinct physical locations and are coupled to one another via a network.

14. The system as claimed in claim 13, further comprising:
  the second computer system associated with the user comprising an interface for forming a connection with a corresponding interface of the ID token, where the first computer is operable to read, via the connection with ID token, at least one attribute stored in the ID.

15. The system as claimed in claim 13, where the program instructions further comprise:
  fourth program instructions that, when executed by the computer processor in response to a request by one or more of the second computer system and the third computer system to block the certificate, blocks the certificate once it has been checked that the request originates from an authority that is associated with the certificate as the owner thereof.

16. The system as claimed in claim 13, where the program instructions further comprise:
  fifth program instructions that, when executed by the computer processor in response to a request from the third computer system to check the validity of the certificate,
  checks the validity of the certificate; and
  sends the result of the check to the third computer system.

17. A computer program product, particularly a computer-readable, non-volatile, non-transitory storage medium with executable program instructions that, when executed on a computer processor of a user computer system, perform a method for generating a transaction-bound certificate, the method comprising:
  sending a transaction request for a user of the user computer system to carry out a transaction from the user computer to a service provider computer system;
  receiving, from the service provider computer system, data to be signed and a signature request for signing the data to be signed, wherein signing of the data to be signed is necessary to carry out the requested transaction and wherein the signature request comprises at least one data value that is only produced specifically for the requested transaction by the service provider computer system once the transaction request has been received by the service provider computer system and wherein a first data value of the at least one data value comprises a document number of an electronic document, an order number of the electronic document, an identifier of the operator of the service provider computer system that sends the signature request, an identifier of the service provider computer system that sends the signature request, or a data value derived therefrom, a data value associated with or derived from the data to be signed, or a data value derived from content of the electronic document;
  responsive to sending the transaction request, checking whether a transaction-bound certificate is available that is suitable for the requested transaction and, if this is not the case, executing the following:
  sending the at least one data value to an ID token to enable the ID token to generate an asymmetric key pair consisting of a private key and a public, wherein the ID token is associated with the user, wherein
  the generated asymmetric key pair is stored on the ID token, and wherein at least the private key is stored in a protected memory area of the ID token;
  transmitting the generated public key and the at least one data value to an ID provider computer system; and
  the user computer system receiving the transaction bound certificate from the ID provider computer system, where the transaction-bound certificate is dependent upon the public key and the at least one data value,
  signing the data to be signed, and
  sending the signed data to be signed and the transaction-bound certificate to the service provider computer system,
wherein checking whether an available transaction-bound certificate is suitable for the requested transaction comprises:
  checking, at least from the first data value of the at least one data value, whether the available transaction-bound certificate is bound to the requested transaction; and
  checking whether an asymmetric key pair affiliated with the available transaction-bound certificate is stored in the ID token.

* * * * *